United States Patent
Abe

(10) Patent No.: US 8,514,427 B2
(45) Date of Patent: Aug. 20, 2013

(54) INFORMATION PROCESSING METHOD AND APPARATUS EQUIPPED WITH A MONITORING UNIT

(75) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1030 days.

(21) Appl. No.: 11/460,096

(22) Filed: Jul. 26, 2006

(65) Prior Publication Data

US 2007/0038667 A1 Feb. 15, 2007

(30) Foreign Application Priority Data

Aug. 12, 2005 (JP) ................................. 2005-234620
Jul. 14, 2006 (JP) ................................. 2006-194350

(51) Int. Cl.
*G06F 3/12* (2006.01)

(52) U.S. Cl.
USPC .................... 358/1.15; 358/1.13; 358/1.16

(58) Field of Classification Search
USPC .................................................. 358/1.9–2.1
See application file for complete search history.

(56) References Cited

U.S. PATENT DOCUMENTS

| 6,178,004 | B1 | 1/2001 | Ochiai | |
|---|---|---|---|---|
| 2004/0049575 | A1 | 3/2004 | Ikeda | |
| 2004/0070779 | A1* | 4/2004 | Ferlitsch | ....................... 358/1.13 |
| 2004/0145767 | A1 | 7/2004 | Endo et al. | |
| 2004/0263900 | A1* | 12/2004 | Nguyen et al. | ................ 358/1.15 |
| 2005/0243363 | A1* | 11/2005 | Muto | ............................ 358/1.15 |
| 2006/0192985 | A1* | 8/2006 | Shen | ............................ 358/1.13 |
| 2007/0038667 | A1* | 2/2007 | Abe | ............................ 707/103 R |

FOREIGN PATENT DOCUMENTS

| EP | 952513 A1 | 10/1999 |
|---|---|---|
| EP | 1178393 A2 | 2/2002 |
| EP | 1496428 A2 | 1/2005 |
| JP | 10-074132 A | 3/1998 |
| JP | 2005-192224 A | 7/2005 |
| WO | WO03/038630 A1 | 5/2003 |

OTHER PUBLICATIONS

EP 1496428, Pub Date Jan. 12, 2005, Nguyen, Amanda System and Method for Automatic Configuration.*

* cited by examiner

*Primary Examiner* — Benny Q Tieu
*Assistant Examiner* — Marcellus Augustin
(74) *Attorney, Agent, or Firm* — Canon USA Inc. IP Division

(57) ABSTRACT

An information processing method in an information processing apparatus that is equipped with a monitoring unit that acquires and retains information from a printing apparatus via a communication channel using an information request or an event registration is provided. The information processing method includes an obtaining step of obtaining from the monitoring unit an acquiring method for acquiring the retained information; an acquiring step of acquiring the retained information in accordance with the obtained acquiring method; and a display controlling step of allowing a display unit to perform a display based on the information acquired in the acquiring step.

9 Claims, 33 Drawing Sheets

| <Enumeration><br>-Query (Schema)-<br>¥Printer.InkInfo | -Retrieve (Schema)- | -Retrieve (Value)- |
|---|---|---|
| | ¥Printer.InkInfo.Black:Installed | True |
| | ¥Printer.InkInfo.Black:State | Full |
| | ¥Printer.InkInfo.Black:Name | CI-B Black |
| | ¥Printer.InkInfo.Cyan:Installed | True |
| | ¥Printer.InkInfo.Cyan:State | Low |
| | ¥Printer.InkInfo.Cyan:Name | CI-C Cyan |
| | ¥Printer.InkInfo.Magenta:Installed | True |
| | ¥Printer.InkInfo.Magenta:State | Out |
| | ¥Printer.InkInfo.Magenta:Name | CI-M Magenta |
| | ¥Printer.InkInfo.Yellow:Installed | True |
| | ¥Printer.InkInfo.Yellow:State | Full |
| | ¥Printer.InkInfo.Yellow:Name | CI-Y Yellow |
| | ¥Printer.InkInfo.PhotoBlack:Installed | True |
| | ¥Printer.InkInfo.PhotoBlack:State | Low |
| | ¥Printer.InkInfo.PhotoBlack:Name | CI-PB Photo Black |
| | ¥Printer.InkInfo.PhotoCyan:Installed | True |
| | ¥Printer.InkInfo.PhotoCyan:State | Out |
| | ¥Printer.InkInfo.PhotoCyan:Name | CI-PC Photo Cyan |
| | ¥Printer.InkInfo.PhotoMagenta:Installed | True |
| | ¥Printer.InkInfo.PhotoMagenta:State | Low |
| | ¥Printer.InkInfo.PhotoMagenta:Name | CI-PM Photo Magenta |
| ¥Printer.StatusInfo | ¥Printer.StatusInfo.Online:Detail | Standby |
| ¥Printer.HardwareInfo | ¥Printer.HardwareInfo:Memory | 2 |
| | ¥Printer.HardwareInfo:HDD | 5 |
| | ¥Printer.HardwareInfo.DuplexUnit:Installed | True |
| | ¥Printer.HardwareInfo.DuplexUnit:Name | Auto Duplex Unit |
| ¥Printer.InputBinsInfo | ¥Printer.InputBinsInfo.ASF:Installed | True |
| | ¥Printer.InputBinsInfo.ASF:Name | ASF-1 |
| | ¥Printer.InputBinsInfo.Tray:Installed | True |
| | ¥Printer.InputBinsInfo.Tray:Name | Manual Tray |
| | ¥Printer.InputBinsInfo.Cassette:Installed | True |
| | ¥Printer.InputBinsInfo.Cassette:Name | Cassette-1 |
| ¥Printer.OutputBinsInfo | ¥Printer.OutputBinsInfo.Tray:Installed | True |
| | ¥Printer.OutputBinsInfo.Tray:Name | Tray-1 |
| | ¥Printer.OutputBinsInfo.Tray:Installed | True |
| | ¥Printer.OutputBinsInfo.Tray:Name | Tray-2 |
| | ¥Printer.OutputBinsInfo.Tray:Installed | True |
| | ¥Printer.OutputBinsInfo.Tray:Name | Tray-3 |

PRINTING AND PRINT
SPOOLER INTERFACES

← → INDICATES AN ADDRESS DATA BUS

FIG.13

| | |
|---|---|
| Definition: | InkInfo |
| Node Type: | Property |
| Description: | INFORMATION AND STATUS OF INK |
| Full Schema Path: | ¥Printer.InkInfo |

| | | |
|---|---|---|
| Definition: | [Color] | |
| Node Type: | Property | |
| Description: | COLOR INFORMATION | |
| Full Schema Path: | ¥Printer.InkInfo.[Color] | |
| Allowed Values: | Black | //BLACK |
| | Cyan | //CYAN |
| | Magenta | //MAGENTA |
| | Yellow | //YELLOW |
| | PhotoBlack | //PHOTO BLACK |
| | PhotoCyan | //PHOTO CYAN |
| | PhotoMagenta | //PHOTO MAGENTA |
| | Red | //RED |
| | Green | //GREEN |
| | Blue | //BLUE |

| | | |
|---|---|---|
| Definition: | Installed | |
| Node Type: | Value | |
| Data Type: | Boolean | |
| Description: | IS [COLOR] INK INSTALLED? | |
| Full Schema Path: | ¥Printer.InkInfo.[Color]:Installed | |
| Allowed Values: | True | //INSTALLED |
| | False | //NOT INSTALLED |

| | | |
|---|---|---|
| Definition: | State | |
| Node Type: | Value | |
| Data Type: | String | |
| Description: | STATUS OF REMAINING AMOUNT OF [COLOR] INK | |
| Full Schema Path: | ¥Printer.InkInfo.[Color]:State | |
| Allowed Values: | Full | //INK REMAINING AMOUNT FULL |
| | Low | //INK REMAINING AMOUNT SMALL |
| | Out | //INK NOT REMAINING |
| | Unknown | //INK REMAINING AMOUNT NOT AVAILABLE |

| | |
|---|---|
| Definition: | Name |
| Node Type: | Value |
| Data Type: | String |
| Description: | NAME OF [COLOR] INK |
| Full Schema Path: | ¥Printer.InkInfo.[Color]:Name |
| Examples: | CI-B Black |
| | CI-C Cyan |
| | CI-M Magenta |
| | CI-Y Yellow |
| | CI-PB Photo Black |
| | DEF Ink-PC PhotoCyan |
| | DEF Ink-PM PhotoMagenta |
| | DEF Ink-R Red |
| | DEF Ink-G Green |
| | DEF Ink-B Blue |

FIG.14

Definition: HardwareInfo
Node Type: Property
Description: HARDWARE INFORMATION
Full Schema Path: ¥Printer.HardwareInfo Definition: Memory
Node Type: Value
Description: MEMORY SIZE
Full Schema Path: ¥Printer.HardwareInfo:Memory
Allowed Values: Integer //UNIT [MB]

Definition: HDD
Node Type: Value
Description: HDD SIZE
Full Schema Path: ¥Printer.HardwareInfo:HDD
Allowed Values: Integer //UNIT [GB]

Definition: [Option]
Node Type: Property
Description: TYPE OF OPTION
Full Schema Path: ¥Printer.HardwareInfo.[Option]
Allowed Values: Duplex Unit //DUPLEX UNIT Definition: Installed
Node Type: Value
Data Type: Boolean
Description: IS [OPTION] OPTION INSTALLED?
Full Schema Path: ¥Printer.HardwareInfo.[Option]:Installed
Allowed Values: True //INSTALLED
False //NOT INSTALLED Definition: Name
Node Type: Value
Data Type: String
Description: NAME OF [OPTION] OPTION
Full Schema Path: ¥Printer.HardwareInfo.[Option]:Name
Examples: Auto Duplex Unit

FIG.15

| | |
|---|---|
| Definition: | InputBinsInfo |
| Node Type: | Property |
| Description: | PAPER FEEDING UNIT INFORMATION |
| Full Schema Path: | ¥Printer.InputBinsInfo |

| | | |
|---|---|---|
| Definition: | [Type] | |
| Node Type: | Property | |
| Description: | TYPE OF PAPER FEEDING UNIT | |
| Full Schema Path: | ¥Printer.InputBinsInfo.[Type] | |
| Allowed Values: | ASF | //AUTO SHEET FEEDER |
| | Tray | //TRAY |
| | Cassette | //CASSETTE |

| | | |
|---|---|---|
| Definition: | Installed | |
| Node Type: | Value | |
| Data Type: | Boolean | |
| Description: | IS [TYPE] PAPER FEEDING UNIT INSTALLED? | |
| Full Schema Path: | ¥Printer.InputBinsInfo.[Type]:Installed | |
| Allowed Values: | True | //INSTALLED |
| | False | //NOT INSTALLED |

| | | |
|---|---|---|
| Definition: | Name | |
| Node Type: | Value | |
| Data Type: | String | |
| Description: | NAME OF [TYPE] PAPER FEEDING UNIT | |
| Full Schema Path: | ¥Printer.InputBinsInfo.[Type]:Name | |
| Examples: | ASF-1 | //AUTO SHEET FEEDER 1 |
| | Manual Tray | //MANUAL FEED TRAY |
| | Cassette-1 | //CASSETTE 1 |
| | Cassette-A | //CASSETTE A |

FIG.16

| <Enumeration><br>-Query (Schema)- | -Retrieve (Schema)- | -Retrieve (Value)- |
|---|---|---|
| ¥Printer.InkInfo | | |
| | ¥Printer.InkInfo.Black:Installed | True |
| | ¥Printer.InkInfo.Black:State | Full |
| | ¥Printer.InkInfo.Black:Name | CI-B Black |
| | ¥Printer.InkInfo.Cyan:Installed | True |
| | ¥Printer.InkInfo.Cyan:State | Low |
| | ¥Printer.InkInfo.Cyan:Name | CI-C Cyan |
| | ¥Printer.InkInfo.Magenta:Installed | True |
| | ¥Printer.InkInfo.Magenta:State | Out |
| | ¥Printer.InkInfo.Magenta:Name | CI-M Magenta |
| | ¥Printer.InkInfo.Yellow:Installed | True |
| | ¥Printer.InkInfo.Yellow:State | Full |
| | ¥Printer.InkInfo.Yellow:Name | CI-Y Yellow |
| | ¥Printer.InkInfo.PhotoBlack:Installed | True |
| | ¥Printer.InkInfo.PhotoBlack:State | Low |
| | ¥Printer.InkInfo.PhotoBlack:Name | CI-PB Photo Black |
| | ¥Printer.InkInfo.PhotoCyan:Installed | True |
| | ¥Printer.InkInfo.PhotoCyan:State | Out |
| | ¥Printer.InkInfo.PhotoCyan:Name | CI-PC Photo Cyan |
| | ¥Printer.InkInfo.PhotoMagenta:Installed | True |
| | ¥Printer.InkInfo.PhotoMagenta:State | Low |
| | ¥Printer.InkInfo.PhotoMagenta:Name | CI-PM Photo Magenta |
| ¥Printer.StatusInfo | | |
| | ¥Printer.StatusInfo.Online:Detail | Standby |
| ¥Printer.HardwareInfo | | |
| | ¥Printer.HardwareInfo:Memory | 2 |
| | ¥Printer.HardwareInfo:HDD | 5 |
| | ¥Printer.HardwareInfo.DuplexUnit:Installed | True |
| | ¥Printer.HardwareInfo.DuplexUnit:Name | Auto Duplex Unit |
| ¥Printer.InputBinsInfo | | |
| | ¥Printer.InputBinsInfo.ASF:Installed | True |
| | ¥Printer.InputBinsInfo.ASF:Name | ASF-1 |
| | ¥Printer.InputBinsInfo.Tray:Installed | True |
| | ¥Printer.InputBinsInfo.Tray:Name | Manual Tray |
| | ¥Printer.InputBinsInfo.Cassette:Installed | True |
| | ¥Printer.InputBinsInfo.Cassette:Name | Cassette-1 |
| ¥Printer.OutputBinsInfo | | |
| | ¥Printer.OutputBinsInfo.Tray:Installed | True |
| | ¥Printer.OutputBinsInfo.Tray:Name | Tray-1 |
| | ¥Printer.OutputBinsInfo.Tray:Installed | True |
| | ¥Printer.OutputBinsInfo.Tray:Name | Tray-2 |
| | ¥Printer.OutputBinsInfo.Tray:Installed | True |
| | ¥Printer.OutputBinsInfo.Tray:Name | Tray-3 |

FIG.19

| | |
|---|---|
| Definition: | SystemInfo |
| Node Type: | Property |
| Description: | SYSTEM INFORMATION |
| Full Schema Path: | ¥Printer.SystemInfo |

| | | |
|---|---|---|
| Definition: | [Component] | |
| Node Type: | Property | |
| Description: | TYPE OF COMPONENT | |
| Full Schema Path: | ¥Printer.SystemInfo.[Component] | |
| Allowed Values: | BookMaker | //BOOK MAKING COMPONENT |

| | | |
|---|---|---|
| Definition: | Installed | |
| Node Type: | Value | |
| Data Type: | Boolean | |
| Description: | IS [COMPONENT] COMPONENT INSTALLED? | |
| Full Schema Path: | ¥Printer.SystemInfo.[Component]:Installed | |
| Allowed Values: | True | //INSTALLED |
| | False | //NOT INSTALLED |

| | |
|---|---|
| Definition: | Name |
| Node Type: | Value |
| Data Type: | String |
| Description: | NAME OF [COMPONENT] COMPONENT |
| Full Schema Path: | ¥Printer.SystemInfo.[Component]:Name |
| Examples: | auto book maker |

FIG.20

```
<Enumeration>
-Query (Schema)-          -Retrieve (Schema)-                          -Retrieve (Value)-
¥Printer.InkInfo
                          ¥Printer.InkInfo.Black:Installed             True
                          ¥Printer.InkInfo.Black:State                 Low
                          ¥Printer.InkInfo.Black:Name                  DEF ink-b black
                          ¥Printer.InkInfo.Cyan:Installed              True
                          ¥Printer.InkInfo.Cyan:State                  Full
                          ¥Printer.InkInfo.Cyan:Name                   DEF ink-c cyan
                          ¥Printer.InkInfo.Magenta:Installed           True
                          ¥Printer.InkInfo.Magenta:State               Full
                          ¥Printer.InkInfo.Magenta:Name                DEF ink-m magenta
                          ¥Printer.InkInfo.Yellow:Installed            True
                          ¥Printer.InkInfo.Yellow:State                Out
                          ¥Printer.InkInfo.Yellow:Name                 DEF ink-y yellow
                          ¥Printer.InkInfo.PhotoCyan:Installed         True
                          ¥Printer.InkInfo.PhotoCyan:State             Low
                          ¥Printer.InkInfo.PhotoCyan:Name              DEF ink-pc photo cyan
                          ¥Printer.InkInfo.PhotoMagenta:Installed      True
                          ¥Printer.InkInfo.PhotoMagenta:State          Out
                          ¥Printer.InkInfo.PhotoMagenta:Name           DEF ink-pm photo magenta
                          ¥Printer.InkInfo.PhotoRed:Installed          True
                          ¥Printer.InkInfo.PhotoRed:State              Full
                          ¥Printer.InkInfo.PhotoRed:Name               DEF ink-r red
¥Printer.StatusInfo
                          ¥Printer.StatusInfo.Online:Detail            Standby
¥Printer.HardwareInfo
                          ¥Printer.HardwareInfo:Memory                 10
                          ¥Printer.HardwareInfo:HDD                    20
                          ¥Printer.HardwareInfo.DuplexUnit:Installed   True
                          ¥Printer.HardwareInfo.DuplexUnit:Name        duplex unit
¥Printer.InputBinsInfo
                          ¥Printer.InputBinsInfo.ASF:Installed         True
                          ¥Printer.InputBinsInfo.ASF:Name              asf-A
                          ¥Printer.InputBinsInfo.Cassette:Installed    True
                          ¥Printer.InputBinsInfo.Cassette:Name         cassette-A
                          ¥Printer.InputBinsInfo.Cassette:Installed    True
                          ¥Printer.InputBinsInfo.Cassette:Name         cassette-B
¥Printer.OutputBinsInfo
                          ¥Printer.OutputBinsInfo.Tray:Installed       True
                          ¥Printer.OutputBinsInfo.Tray:Name            tray-A
                          ¥Printer.OutputBinsInfo.Tray:Installed       True
                          ¥Printer.OutputBinsInfo.Tray:Name            tray-B
                          ¥Printer.OutputBinsInfo.Tray:Installed       True
                          ¥Printer.OutputBinsInfo.Tray:Name            tray-C
                          ¥Printer.OutputBinsInfo.Tray:Installed       True
                          ¥Printer.OutputBinsInfo.Tray:Name            tray-D
¥Printer.SystemInfo
                          ¥Printer.SystemInfo.BookMaker:Installed      True
                          ¥Printer.SystemInfo.BookMaker:Name           auto book maker
```

FIG.21

-REQUEST COMMAND ISSUED FROM PC-

ReqInk;

ReqMemory;

ReqHdd;

ReqStatus;

ReqOption;

ReqInputBins;

ReqOutputBins;

ReqSystem;

-INFORMATION RETURNED FROM PRINTER-

AnsInk:black.ink-b.Low,cyan.ink-c.Full,magenta.inc-m.Full,yellow.ink-y.out, photocyan.ink-pc.Low,Photomagenta.ink-pm,Out,red ink-r.Full;

AnsMemory:10;

AnsHdd:20;

AnsStatus:ol;

AnsOption:du;

AnsInputBins:asf-A,cassette-A,cassette-B

AnsOutputBins:tray-A,tray-B,tray-C,tray-D;

AnsSytem:abm;

FIG.24

```
Definition:       StatusInfo
Node Type:        Property
Description:      OPERATION STATUS
Full Schema Path: ¥Printer.StatusInfo Definition:       [Type]
Node Type:        Property
Description:      TYPE OF OPERATION STATUS
Full Schema Path: ¥Printer.StatusInfo.[Type]
Allowed Values:   Online              //ONLINE
                  Offline             //OFFLINE
                  Printing            //PRINTING
                  Warning             //WARNING
                  Error               //ERROR Definition:       Detail
Node Type:        Value
Data Type:        String
Description:      DETAILED INFORMATION ON [TYPE] OPERATION STATUS
Full Schema Path: ¥Printer.StatusInfo.[Type]:Detail
Examples:         Standby
                  Checking the printer.¥nPlease wait...
                  Paper out.¥nInsert papers.
```

FIG.25

<Enumeration>
-Query (Schema)-
¥Printer.InkInfo

| -Retrieve (Schema)- | -Retrieve (Value)- |
|---|---|
| ¥Printer.InkInfo.Black:Installed | True |
| ¥Printer.InkInfo.Black:State | Low |
| ¥Printer.InkInfo.Black:Name | DEF ink-b black |
| ¥Printer.InkInfo.Cyan:Installed | True |
| ¥Printer.InkInfo.Cyan:State | Full |
| ¥Printer.InkInfo.Cyan:Name | DEF ink-c cyan |
| ¥Printer.InkInfo.Magenta:Installed | True |
| ¥Printer.InkInfo.Magenta:State | Full |
| ¥Printer.InkInfo.Magenta:Name | DEF ink-m magenta |
| ¥Printer.InkInfo.Yellow:Installed | True |
| ¥Printer.InkInfo.Yellow:State | Out |
| ¥Printer.InkInfo.Yellow:Name | DEF ink-y yellow |
| ¥Printer.InkInfo.PhotoCyan:Installed | True |
| ¥Printer.InkInfo.PhotoCyan:State | Low |
| ¥Printer.InkInfo.PhotoCyan:Name | DEF ink-pc photo cyan |
| ¥Printer.InkInfo.PhotoMagenta:Installed | True |
| ¥Printer.InkInfo.PhotoMagenta:State | Out |
| ¥Printer.InkInfo.PhotoMagenta:Name | DEF ink-pm photo magenta |
| ¥Printer.InkInfo.PhotoRed:Installed | True |
| ¥Printer.InkInfo.PhotoRed:State | Full |
| ¥Printer.InkInfo.PhotoRed:Name | DEF ink-r red |

¥Printer.StatusInfo

| ¥Printer.StatusInfo.Error:Detail | Paper out.¥nInsert papers. |
|---|---|

¥Printer.HardwareInfo

| ¥Printer.HardwareInfo:Memory | 10 |
|---|---|
| ¥Printer.HardwareInfo:HDD | 20 |
| ¥Printer.HardwareInfo.DuplexUnit:Installed | True |
| ¥Printer.HardwareInfo.DuplexUnit:Name | duplex unit |

¥Printer.InputBinsInfo

| ¥Printer.InputBinsInfo.ASF:Installed | True |
|---|---|
| ¥Printer.InputBinsInfo.ASF:Name | asf-A |
| ¥Printer.InputBinsInfo.Cassette:Installed | True |
| ¥Printer.InputBinsInfo.Cassette:Name | cassette-A |
| ¥Printer.InputBinsInfo.Cassette:Installed | True |
| ¥Printer.InputBinsInfo.Cassette:Name | cassette-B |

¥Printer.OutputBinsInfo

| ¥Printer.OutputBinsInfo.Tray:Installed | True |
|---|---|
| ¥Printer.OutputBinsInfo.Tray:Name | tray-A |
| ¥Printer.OutputBinsInfo.Tray:Installed | True |
| ¥Printer.OutputBinsInfo.Tray:Name | tray-B |
| ¥Printer.OutputBinsInfo.Tray:Installed | True |
| ¥Printer.OutputBinsInfo.Tray:Name | tray-C |
| ¥Printer.OutputBinsInfo.Tray:Installed | True |
| ¥Printer.OutputBinsInfo.Tray:Name | tray-D |

¥Printer.SystemInfo

| ¥Printer.SystemInfo.BookMaker:Installed | True |
|---|---|
| ¥Printer.SystemInfo.BookMaker:Name | auto book maker |

FIG.26

-REQUEST COMMAND ISSUED FROM PC-

ReqInk;

-INFORMATION RETURNED FROM PRINTER-

AnsInk:black.ink-b.Low,cyan.ink-c.Full,magenta.inc-m.Full,yellow.ink-y.out, photocyan.ink-pc.Low,Photomagenta.ink-pm,Out,red ink-r.Full;

ReqMemory;

AnsMemory:10;

ReqHdd;

AnsHdd:20;

ReqStatus;

AnsStatus:pe;

ReqInputBins;

AnsInputBins:asf-A,cassette-A,cassette-B

ReqOutputBins;

AnsOutputBins:tray-A,tray-B,tray-C,tray-D;

ReqSystem

AnsSytem:abm

FIG.31
PRIOR ART

| <Enumeration><br>-Query (Schema)-<br>¥Printer.InkInfo | -Retrieve (Schema)- | -Retrieve (Value)- |
|---|---|---|
| | ¥Printer.InkInfo.Black:Installed | True |
| | ¥Printer.InkInfo.Black:State | Full |
| | ¥Printer.InkInfo.Black:Name | CI-B Black |
| | ¥Printer.InkInfo.Cyan:Installed | True |
| | ¥Printer.InkInfo.Cyan:State | Low |
| | ¥Printer.InkInfo.Cyan:Name | CI-C Cyan |
| | ¥Printer.InkInfo.Magenta:Installed | True |
| | ¥Printer.InkInfo.Magenta:State | Out |
| | ¥Printer.InkInfo.Magenta:Name | CI-M Magenta |
| | ¥Printer.InkInfo.Yellow:Installed | True |
| | ¥Printer.InkInfo.Yellow:State | Full |
| | ¥Printer.InkInfo.Yellow:Name | CI-Y Yellow |
| ¥Printer.StatusInfo | | |
| | ¥Printer.StatusInfo.Online:Detail | Standby |
| ¥Printer.HardwareInfo | | |
| | ¥Printer.HardwareInfo:Memory | 2 |
| ¥Printer.InputBinsInfo | | |
| | ¥Printer.InputBinsInfo.ASF:Installed | True |
| | ¥Printer.InputBinsInfo.ASF:Name | ASF-1 |
| ¥Printer.OutputBinsInfo | | |
| | ¥Printer.OutputBinsInfo.Tray:Installed | True |
| | ¥Printer.OutputBinsInfo.Tray:Name | Tray-1 |

FIG.32
PRIOR ART

| | |
|---|---|
| Definition: | InkInfo |
| Node Type: | Property |
| Description: | INFORMATION AND STATUS OF INK |
| Full Schema Path: | ¥Printer.InkInfo |

| | | |
|---|---|---|
| Definition: | [Color] | |
| Node Type: | Property | |
| Description: | COLOR INFORMATION | |
| Full Schema Path: | ¥Printer.InkInfo.[Color] | |
| Allowed Values: | Black | //BLACK |
| | Cyan | //CYAN |
| | Magenta | //MAGENTA |
| | Yellow | //YELLOW |

| | | |
|---|---|---|
| Definition: | Installed | |
| Node Type: | Value | |
| Data Type: | Boolean | |
| Description: | IS [COLOR] INK INSTALLED? | |
| Full Schema Path: | ¥Printer.InkInfo.[Color]:Installed | |
| Allowed Values: | True | //INSTALLED |
| | False | //NOT INSTALLED |

| | | |
|---|---|---|
| Definition: | State | |
| Node Type: | Value | |
| Data Type: | String | |
| Description: | STATUS OF REMAINING AMOUNT OF [COLOR] INK | |
| Full Schema Path: | ¥Printer.InkInfo.[Color]:State | |
| Allowed Values: | Full | //INK REMAINING AMOUNT FULL |
| | Low | //INK REMAINING AMOUNT SMALL |
| | Out | //INK NOT REMAINING |
| | Unknown | //INK REMAINING AMOUNT NOT AVAILABLE |

| | |
|---|---|
| Definition: | Name |
| Node Type: | Value |
| Data Type: | String |
| Description: | NAME OF [COLOR] INK |
| Full Schema Path: | ¥Printer.InkInfo.[Color]:Name |
| Examples: | CI-B Black |
| | CI-C Cyan |
| | CI-M Magenta |
| | CI-Y Yellow |

FIG.33
PRIOR ART

| | |
|---|---|
| Definition: | OutputBinsInfo |
| Node Type: | Property |
| Description: | PAPER DISCHARGE UNIT INFORMATION |
| Full Schema Path: | ¥Printer.OutputBinsInfo |

| | | |
|---|---|---|
| Definition: | [Type] | |
| Node Type: | Property | |
| Description: | TYPE OF PAPER DISCHARGE UNIT | |
| Full Schema Path: | ¥Printer.OutputBinsInfo.[Type] | |
| Allowed Values: | Tray | //TRAY |

| | | |
|---|---|---|
| Definition: | Installed | |
| Node Type: | Value | |
| Data Type: | Boolean | |
| Description: | IS [TYPE] PAPER DISCHARGE UNIT INSTALLED? | |
| Full Schema Path: | ¥Printer.OutputBinsInfo.[Type]:Installed | |
| Allowed Values: | True | //INSTALLED |
| | False | //NOT INSTALLED |

| | | |
|---|---|---|
| Definition: | Name | |
| Node Type: | Value | |
| Data Type: | String | |
| Description: | NAME OF [TYPE] PAPER DISCHARGE UNIT | |
| Full Schema Path: | ¥Printer.OutputBinsInfo.[Type]:Name | |
| Examples: | Tray-1 | //TRAY 1 |
| | Tray-2 | //TRAY 2 |
| | Tray-A | //TRAY A |

INFORMATION PROCESSING METHOD AND APPARATUS EQUIPPED WITH A MONITORING UNIT

BACKGROUND OF THE INVENTION

1. Field of the Invention

The present invention relates to a technology for acquiring information from a peripheral device.

2. Description of the Related Art

In recent years, various kinds of peripheral devices such as printers and scanners are used in offices, at home, and in public facilities. In addition, various kinds and types of utilities that help a user who utilizes the peripheral device have been developed and put into practical use.

For example, as a utility utilized in an ink jet printer, a utility that can browse information related to an ink cartridge installed to a printing apparatus body and a state of a printing job input to the printing apparatus by a client computer is known.

On the other hand, as a well-known technology related to acquiring various kinds of information of the peripheral devices, there is, for example, a Management Information Base (MIB) that is provided in RFC 1213 of the Management Information Base. Japanese Patent Application Laid-Open No. 10-074132 discusses a technology for obtaining information of the printing apparatus by using the MIB.

In addition, there is another well-known technology for acquiring various kinds of information. For example, there is a Bidi Communications Schema (BCS), which is made public at a website of the Microsoft Developer Network (MSDN) at "http://msdn.microsoft.com/library/default.asp". In addition, note that the Bidi Communications Schema is sometimes referred to as a Bidi Schema in the description below.

FIG. 31 is a diagram illustrating a configuration of a conventional example describing a schema and a value used in enumerating information and a state of ink, an operation status, hardware information, paper feed unit information, and paper discharge unit information by using the schema.

Referring to FIG. 31, the schema is specified from the utility so as to call an IBidiSpl::SendRecv( ) function. The schema that is specified includes "¥Printer.InkInfo", "¥Printer.StatusInfo", "¥Printer.HardwareInfo", "¥Printer.InputBinsInfo", and "¥Printer.OutputBinsInfo".

Then, in a "Query" (Schema) column, a schema "Retrieve" (Schema) that describes printer information and the printer status and a value "Retrieve" (Value) are returned in a set.

In the example as shown in FIG. 31, black, cyan, magenta, and yellow inks are loaded in the printer, and each state describes "Ink remaining amount full (Full)", "Ink remaining amount low (Low)", "Ink not remaining (Out)", and "Ink remaining amount full (Full)", respectively.

In addition, each ink name describes "CI-B Black", "CI-C Cyan", "CI-M Magenta", and "CI-Y Yellow", respectively.

In addition, FIG. 31 shows that the operation state is "Online" and in a "Standby" mode, that the size of a memory installed to the printer is 2 MB, that an auto sheet feeder named "ASF-1" is installed to the printer as the paper feed unit, and that a tray named "Tray-1" is installed to the printer as the paper discharge unit.

As described above, the utility enumerates various kinds of information by using the schema so as to obtain all the detailed information on the printer that is described by the schema.

FIG. 32 describes schemata of a conventional example that are used when the utility acquires the information concerning the ink and the state of the ink from the printer. More specifically, the schemata are specified as arguments in the call of an application program interface (API) function "IBidiSpl::SendRecv( )" of a COM interface "IBidiSpl" used in the Windows (registered trademark) XP OS when the utility acquires the information concerning the ink and the state of the ink from the printer via printing and print spooler interfaces (hereinafter sometimes referred to as "PPSI").

Referring to FIG. 32, "InkInfo" has a node type "Property" and indicates information concerning ink. The full path to the "InkInfo" in the schema is "¥Printer.InkInfo". "[Color]" has the node type "Property" and indicates information concerning color. The full path to the "[Color]" in the schema is "¥Printer.InkInfo.[Color]". Allowed values are "Black" indicating black, "Cyan" indicating cyan, "Magenta" indicating magenta, and "Yellow" indicating yellow.

When the information concerning the black ink is to be acquired, "¥Printer.InkInfo.Black" is specified. "Installed" has a node type "Value" and a data type "Boolean", and indicates whether the [Color] ink is loaded. The full path to the "Installed" in the schema is "¥Printer.InkInfo.[Color]:Installed". Allowed values are "True" indicating that the [Color] ink is loaded and "False" indicating that the [Color] ink is not loaded.

"State" has the node type "Value" and a data type "String", and indicates the states of the remaining amount of the [Color] ink. The full path to the "State" in the schema is "¥Printer.InkInfo.[Color]:State". Allowed values are "Full" indicating that the [Color] ink is full, "Low" indicating that the remaining amount of the [Color] ink is low, "Out" indicating that the [Color] ink is out, and "Unknown" indicating that the remaining amount of the [Color] ink is unknown.

"Name" has the node type "Value" and a data type "String", and indicates the name of the [Color] ink. The full path to the "Name" in the schema is "¥Printer.InkInfo.[Color]:Name".

Allowed values are, for example, ASCII character strings shown in "Examples" in FIG. 32.

FIG. 33 describes schemata of a conventional example that are used when the utility acquires the information concerning the paper discharge unit from the printer. The schemata are specified as arguments in the call of the API function "IBidiSpl::SendRecv( )" of the COM interface "IBidiSpl" used in the Windows (registered trademark) XP OS when the utility acquires the information concerning the paper discharge unit from the printer via the printing and print spooler interfaces.

Referring to FIG. 33, "OutputBinsInfo" has a node type "Property" and indicates information concerning the paper discharge unit. The full path to the "OutputBinsInfo" in the schema is "¥Printer.OutputBinsInfo". "[Type]" has the node type "Property" and indicates the type of the paper discharge unit. The full path to the "[Type]" in the schema is "¥Printer.OutputBinsInfo.[Type]". An allowed value is "Tray" indicating a tray.

When the information concerning the tray that is the paper discharge unit is to be acquired, "¥Printer.OutputBinsInfo.Tray" is specified. "Installed" has a node type "Value" and a data type "Boolean", and indicates whether the [Type] paper discharge unit is installed. The full path to the "Installed" in the schema is "¥Printer.OutputBinsInfo.[Type]:Installed". Allowed values are "True" indicating that the [Type] paper discharge unit is installed and "False" indicating that the [Type] paper discharge unit is not installed.

"Name" has the node type "Value" and a data type "String", and indicates the name of the [Type] paper discharge unit. The full path to the "Name" in the schema is "¥Printer.OutputBinsInfo.[Type]:Name". Allowed values are, for example, ASCII character strings as shown in "Examples" in FIG. 33. In this manner, the utility acquires the information concerning the paper discharge unit by using the schemata defined in FIG. 33.

In this regard, however, in the above structure, when an unexpected new kind of information of the printing apparatus is added, a redesign of an upper unit (utility) is necessary. That is, a program for acquiring the newly-added new kind of information, for example, cannot be installed to the upper unit (utility). Therefore, a structure for acquiring the information of the printing apparatus more flexibly is desired.

SUMMARY OF THE INVENTION

According to an aspect of the present invention, there is provided an information processing method in an information processing apparatus that is equipped with a monitoring unit that acquires and retains information from a printing apparatus via a communication channel using an information request or an event registration. The information processing method includes an obtaining step of obtaining from the monitoring unit an acquiring method for acquiring retained information; an acquiring step of acquiring the retained information in accordance with the obtained acquiring method; and a display controlling step of allowing a display unit to perform a display based on the information acquired in the acquiring step.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a diagram illustrating the schemata that are used when the utility acquires information and a state of ink loaded in a printer.

FIG. 14 is a diagram illustrating the schemata that are used when the utility acquires hardware information of the printer.

FIG. 15 is a diagram illustrating the schemata that are used when the utility acquires information concerning a paper feed unit of the printer.

FIG. 16 is a diagram illustrating an example of schemata and values when the information of the printer is enumerated.

FIG. 19 is a diagram illustrating schemata that are used when the utility acquires information of a paper feed unit of the printer.

FIG. 20 is a diagram illustrating an example of schemata and values when the information of the printer is enumerated.

FIG. 21 is a diagram illustrating data sent and received between the PC and the printer.

FIG. 24 is a diagram illustrating schemata that are used when the utility acquires an operation state of the printer.

FIG. 25 is a diagram illustrating an example of schemata and values when the information of the printer is enumerated.

FIG. 26 is a diagram illustrating data sent and received between the PC and the printer.

FIG. 31 is a diagram illustrating an example of schemata and values when the information of the printer is enumerated according to a conventional example.

FIG. 32 is a diagram illustrating a known example of schemata that are used when the utility acquires the printer information according to the conventional example.

FIG. 33 is a diagram illustrating a known example of schemata that are used when the utility acquires the printer information according to the conventional example.

DETAILED DESCRIPTION OF THE EMBODIMENTS

Embodiments of the present invention will now be described, by way of example only, in detail with reference to the drawings. It should be noted that the relative arrangement of the components, the numerical expressions and numerical values set forth in these embodiments do not limit the scope of the present invention unless it is specifically stated otherwise.

First Embodiment

<Description of an Outline of a Printing System>

Figure 1:
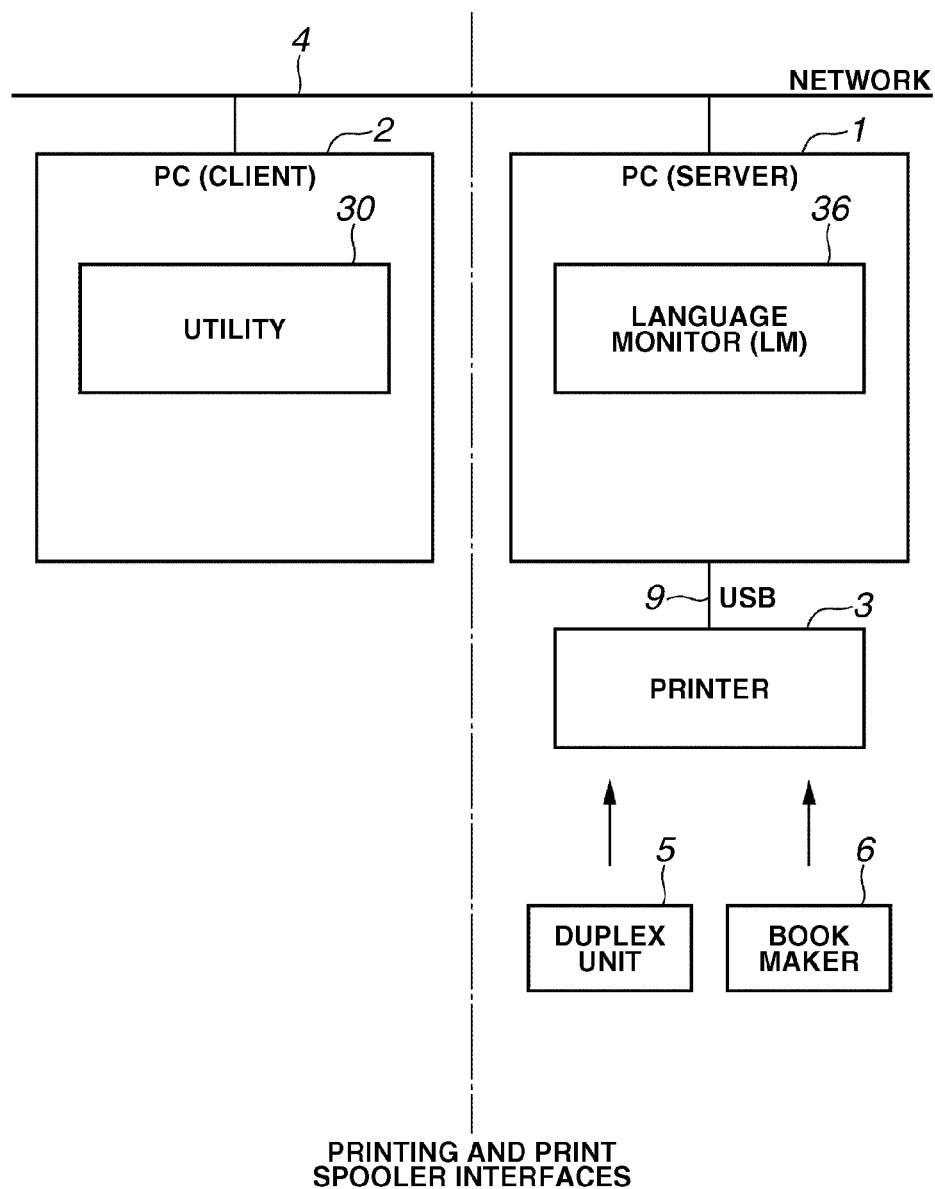
FIG. 1 is a diagram illustrating an example of an outline of a printing system.

FIG. 1 shows an outline of a printing system according to a first embodiment of the present invention. Referring to FIG. 1, an information processing apparatus 1 (hereinafter referred to as a "PC 1"), an information processing apparatus 2 (hereinafter referred to as a "PC 2"), and a printer 3 are communicably connected via a given communication channel. In addition, the printing system is provided with a principal software module.

The PC 1 and the PC 2 are respectively configured by hardware that is the same as the hardware of a common information processing apparatus, and are respectively installed with a given operating system (hereinafter referred to as an "OS"). In the printing system according to this embodiment, the Windows (registered trademark) XP of Microsoft Corporation of the U.S. is installed. In this regard, the PC 1 and the PC 2 are mutually connected via a network 4 that is configured by Ethernet (registered trademark), and are allowed to perform two-way communication.

The printer 3 is a representative example of a peripheral device. In FIG. 1, a color ink jet printer is connected to the PC 1 via a universal serial bus (hereinafter referred to as a "USB").

A language monitor 36 (hereinafter referred to as an "LM 36") makes an inquiry to the printer 3 and outputs various kinds of commands. In addition, the LM 36 has a function for acquiring various kinds of information positively sent and notified from the printer 3. With this function, the LM 36 registers an event to the printer 3 in advance at a certain appropriate timing so as to implement the positive notification.

A duplex unit 5 is an example of an option of the printer 3. The printer 3 is installed with the duplex unit 5 so as to perform an automatic duplex printing.

A bookmaking component 6 is another example of the option of the printer 3. The printer 3 is installed with a bookmaking component 6 so as to perform a bookmaking processing.

A utility 30 is provided with a function for acquiring and displaying various kinds of information of the printing apparatus via the LM 36, and/or outputting various kinds of commands to the printing apparatus, and/or producing and outputting print data. In this embodiment, the utility 30 may be a utility for various purposes.

Note that in the above description, the color ink jet printer is referred to as a representative example of the peripheral device. However, another form of application can be thought of. That is, there are other peripheral devices that can be applied in this embodiment. Namely, a copying machine, a facsimile, a scanner, a multifunction peripheral, a digital still camera, a digital video camera, a cellular phone, a television set, and an optical projector can be applied in this embodiment.

<Description of a Hardware Configuration of a Common Information Processing Apparatus>

Figure 2:
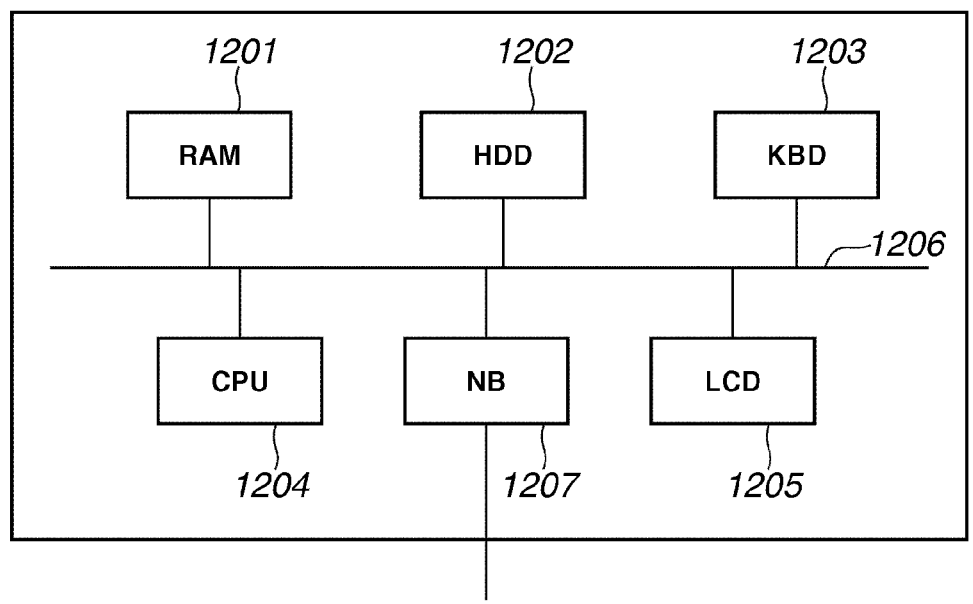
FIG. 2 is a block diagram illustrating an example of a hardware configuration of a common information processing apparatus.

FIG. 2 is a block diagram illustrating an example of a hardware configuration of a common information processing apparatus.

Referring to FIG. 2, a CPU 1204 is configured by a microprocessor and the like. The CPU 1204 implements a program that is stored in a hard disc drive HDD 1202. The CPU 1204 controls each device (each block) that is connected to a system bus 1206. A RAM 1201 functions as a main memory and a work area of the CPU 1204. A keyboard (KBD) 1203 is an example of an input instruction device for inputting various kinds of information. In this regard, in addition or as an alternative to the keyboard (KBD), a mouse, a liquid crystal touch panel, for example, can be applied. An LCD 1205 is an example of a display device. The LCD 1205 displays characters, graphic images, still images, and moving images, under control of the CPU 1204. An NB 1207 is a network board, which is an example of a communication control unit. The NB 1207 can control the communication according to various kinds of protocol.

In addition, a program code for allowing a computer to implement the processing related to each step of each flow chart to be described later is stored in the HDD 1202. The program code is read to the RAM 1201 so as to be executed by the CPU 1204.

<Description on a Hardware Configuration of the Peripheral Device>

Figure 3:
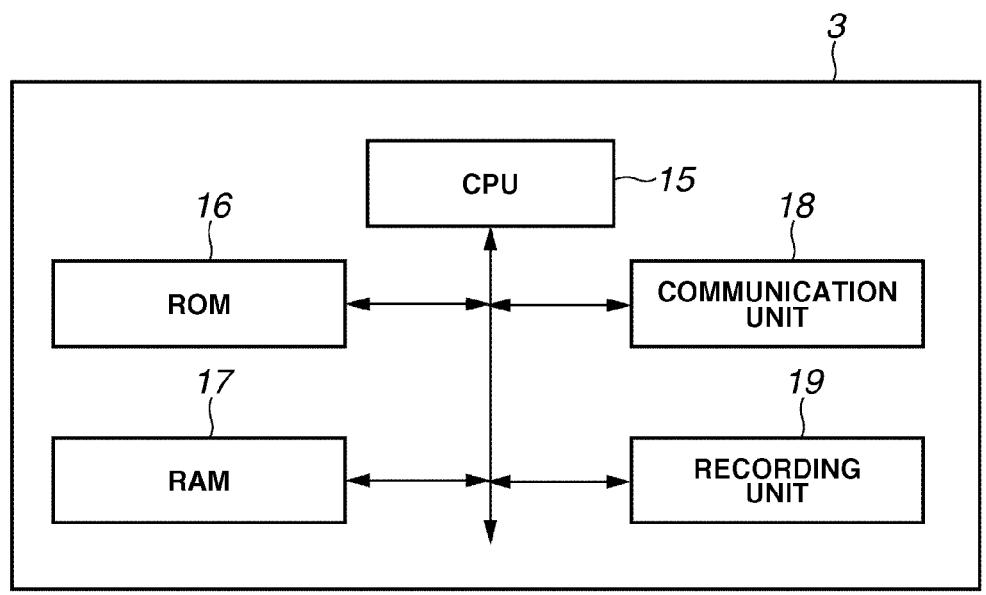
FIG. 3 is a block diagram illustrating an example of a hardware configuration of a peripheral device.

FIG. 3 is a block diagram illustrating a representative example of the hardware configuration of the peripheral device.

A CPU 15 is configured by a microprocessor and the like. The CPU 15 is a central processing unit of the printer 3, and performs various kinds of processing in accordance with a program stored in a ROM 16. The CPU 15 controls over each device such as a RAM 17, a communication unit 18, and a recording unit 19, which are mutually connected via a system bus. Note that the ROM 16 may be a memory that includes a nonvolatile storage element. For example, a hard disk device or an electrically-erasable flash memory may be used in substitution to the ROM 16.

In addition, the ROM 16, the RAM 17, and the recording unit 19 are described in more detail below.

The ROM 16 stores the program for allowing the printer 3 to perform a recording (printing) processing according to input print data. In addition, the ROM 16 stores the program for performing a processing for sending information of a state upon request of the status by the PC 1.

The RAM 17 stores print data sent from the PC 1, for example. The communication unit 18 includes a communication port for a USB interface 9, and controls the communication based on the USB.

The recording unit 19 is configured by a recording section and an electric circuit. The recording section includes an ink jet type recording head, each color ink, a carriage, and a recording paper conveying mechanism. The electric circuit includes an ASIC for allowing the recording head to generate a pulsation for printing according to the print data. The recording unit 19 performs the recording according to the print data that the RAM 17 temporarily stores. Note that in the above description, the peripheral device including an ink jet type output engine is referred to as an example. However, another type output engine may be applied. For example, an electrophotographic system output engine or a thermal transfer system output engine can be applied. In addition, a liquid crystal driving engine that drives a liquid crystal display panel can be applied.

<Description on a Diagram of a Software Module in a Client PC>

Figure 4:
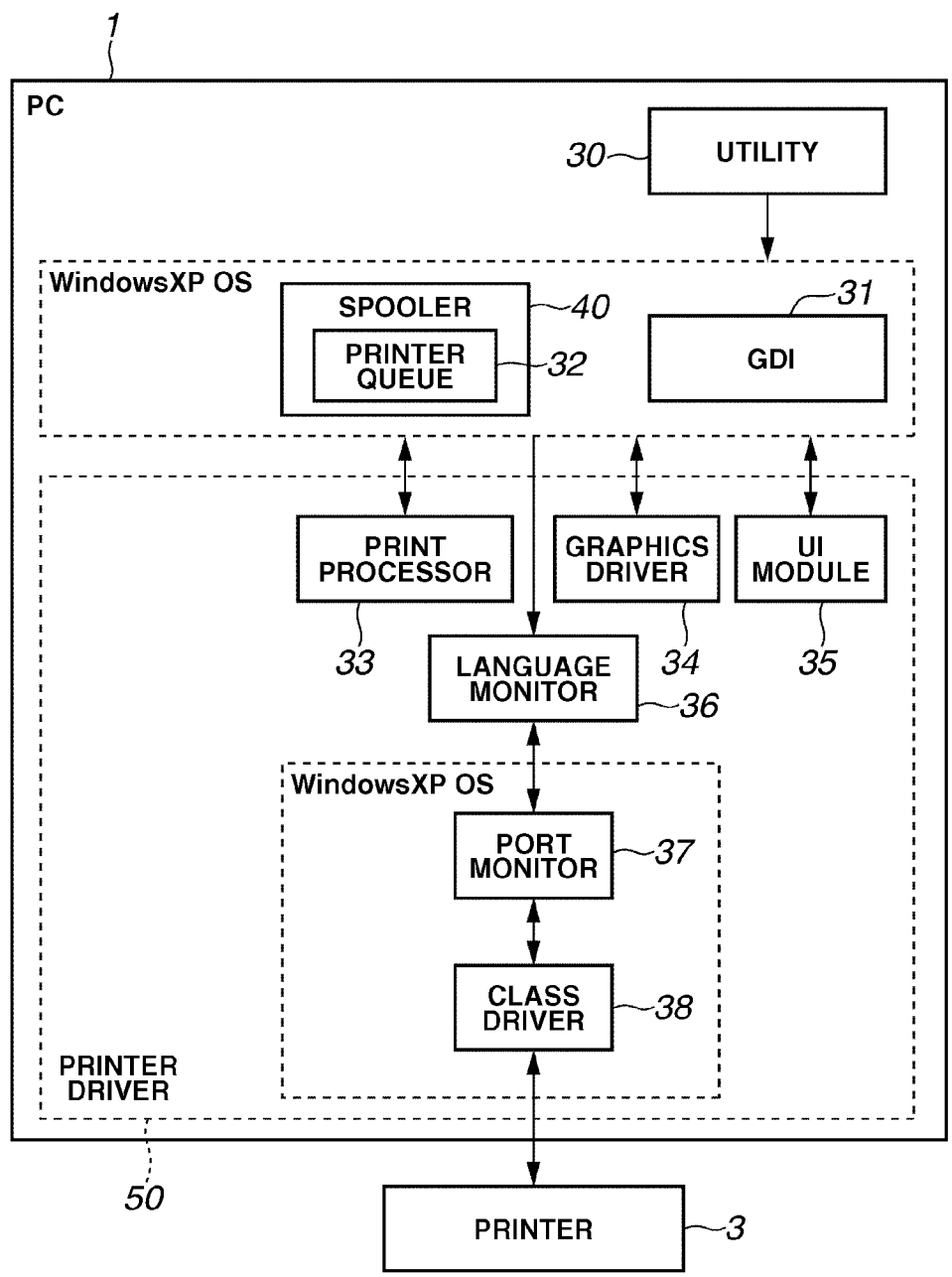
FIG. 4 is a diagram illustrating an example of a block diagram of a software module that operates on the information processing apparatus.

FIG. 4 is a diagram illustrating an example of a block diagram of a software module that operates on the PC 1, which is the information processing apparatus.

Referring to FIG. 4, a printer driver 50 produces a rendering command according to various application data operating on the OS. For a format of the rendering command, various kinds of formats can be applied, as long as the format of the rendering command can be decoded and read by the printer. Namely, the rendering command may be in the form of a non-compressed image, a compressed image, a page description language, or XML data. In addition, various kinds of application software can be applied. For example Word of Microsoft Corporation, Excel of Microsoft Corporation, and Photoshop of Adobe Systems, Inc. may be used.

Figure 12:
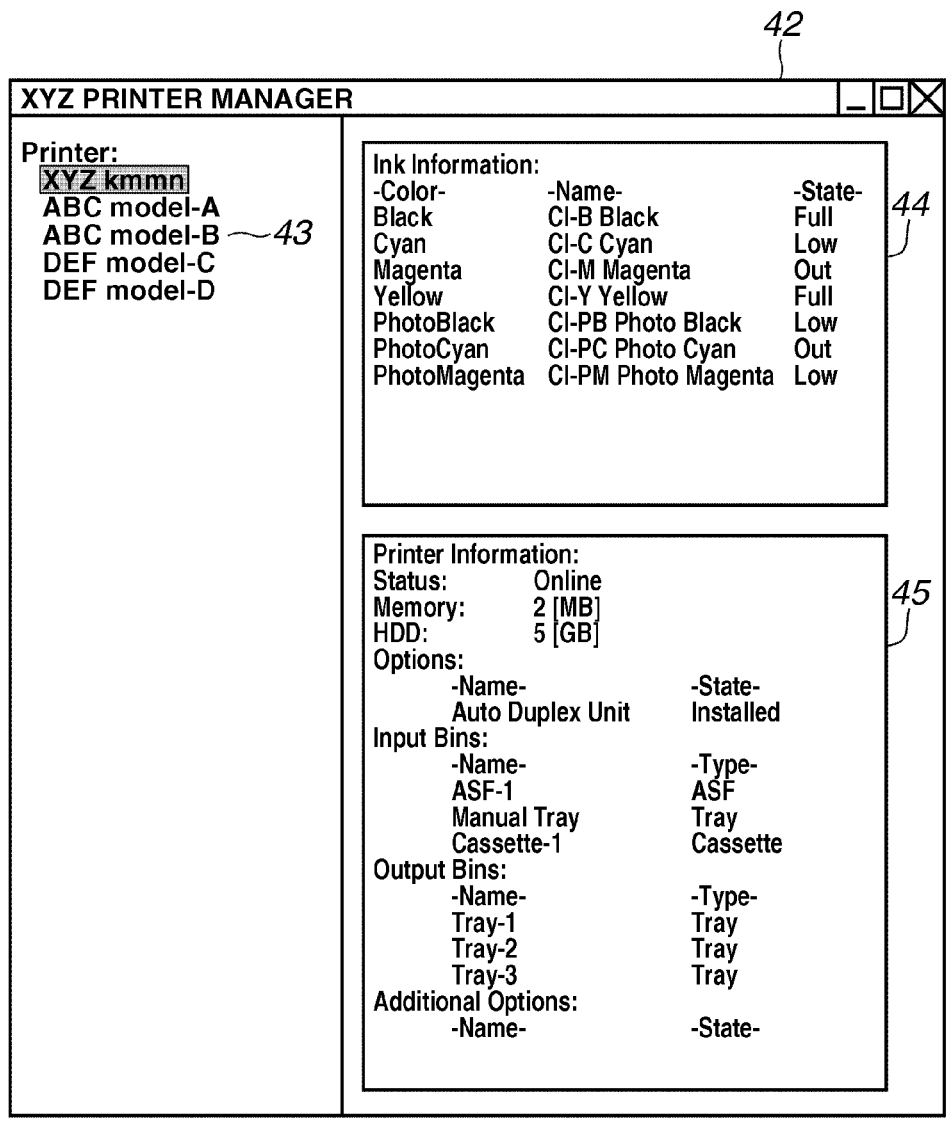
FIG. 12 is a diagram illustrating an appearance of a user interface of the utility.

The utility 30 is as described with reference to FIG. 1. For the utility 30, Notepad (Notepad.exe), which is a text editor supplied with Windows (registered trademark) XP OS as standard, can be applied. In addition, the utility 30 as shown in FIG. 12, which is described later below, can be applied.

A graphics device interface (GDI) 31 constitutes a part of the OS. In addition, a printer queue 32 constitutes a part of a spooler 40. The printer queue 32 queues print jobs. The print jobs that are in the printer queue 32 are displayed in a printer queue folder (a description of the printer queue is omitted here) by the OS, so that a user can confirm various kinds of states of the print job.

A print processor 33 changes a print layout and performs special processing of a print image. A graphics driver 34 is a core portion for image processing by the printer driver. That is, the graphics driver 34 performs processing of an image for printing according to the rendering command sent from the GDI 31 and produces a print control command. A UI module 35 provides and controls a user interface of the printer driver. The LM 36 is as described with reference to FIG. 1. The LM 36 has a function for controlling sending and receiving of data as a communication interface of the data. A port monitor 37 performs processing for sending the data sent from the LM 36 to an appropriate port and processing for receiving the data sent from the printer 3 via a class driver 38. The class driver 38 is a control module that is close to a physical layer. The class driver 38 is equivalent to a USB printer class driver, for example. The class driver 38 controls USB ports.

<Description on a Flow of a Processing in the Printing System>

An outline of the flow of the processing in this embodiment is now described with reference to FIG. 5.

Figure 5:
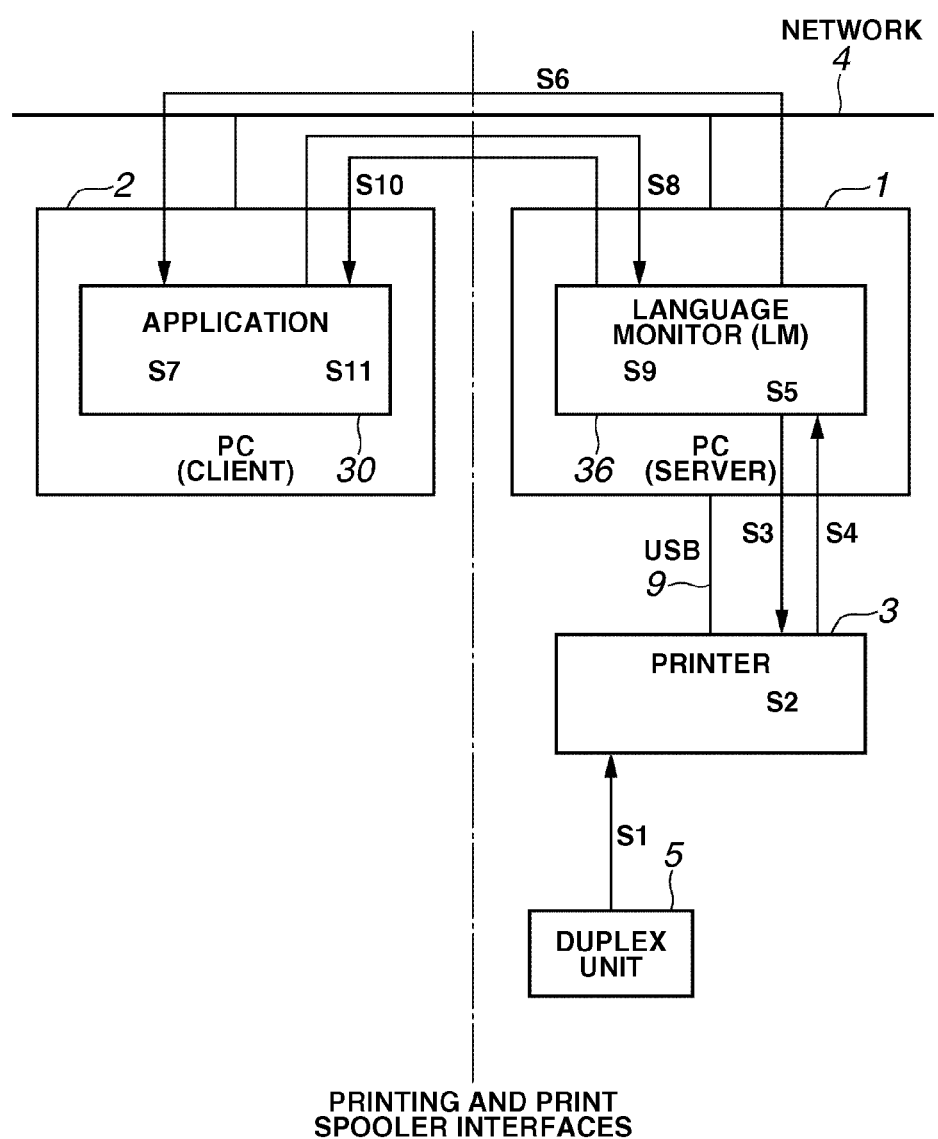
FIG. 5 is a diagram illustrating a flow of a processing in the printing system.

FIG. 5 describes the processing flow for a case where the duplex unit 5 is installed to the printer 3 in the system as described with reference to FIG. 1, as an example.

First, the duplex unit 5 is installed to the printer 3 (step S1). The printer 3, using a determination unit provided to the printer 3, determines that the duplex unit 5 is installed to the printer 3 (step S2).

Meanwhile, asynchronously (i.e. at an arbitrary timing) to the determination in step S2, the PC 1 issues a request command requesting various kinds of information of the printing apparatus to the printer 3 via the USB interface (step S3).

The printer 3 returns the information of the printer to the PC 1 via a communication medium, in response to the request command issued from the PC 1 (step S4). The information requested from the LM 36 includes printer information and job information. The printer information includes, for example, a type of the ink that is loaded to the printer 3, information on the option currently installed to the printer 3, state of errors of in the printer 3, and state of power. The job information includes state of progress of the print job input to the printer 3.

The LM 36 acquires the information returned from the printer 3 and analyses the acquired information. The LM 36 determines whether there is a change in the information that has been previously acquired and stored, in accordance with a result of the analysis. If it is determined that there is a change, the LM 36 converts the information of the state after the change into a schema in accordance with a definition of schema. Then, the LM 36 stores the converted information to a storage unit (step S5). The processing in step S5 is equivalent to the processing of converting and retaining the information in a format for responding to a request for obtaining the information indicating the change issued from the utility. Here, the term "schema" generally means a data base description that utilizes a definition language. The schema includes, as a representative example, an XML schema.

Figure 7:
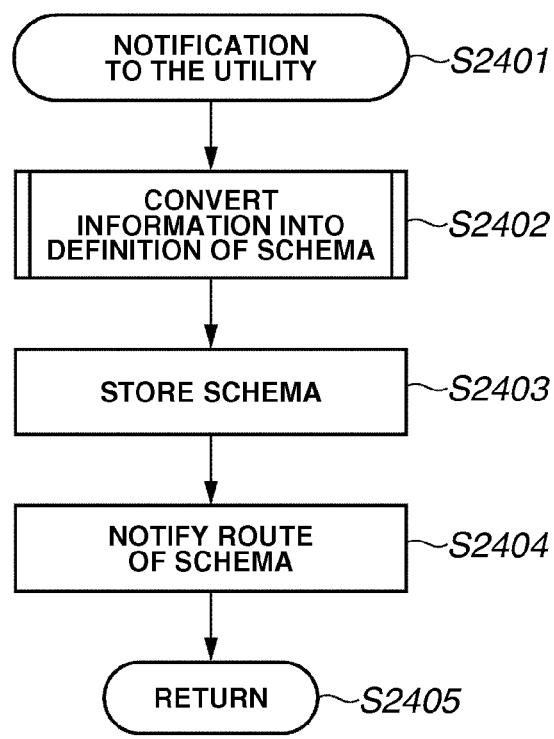
FIG. 7 is a flow chart of a notification service processing performed by the monitoring unit.

Then, after the information converted into the schema is stored by the LM 36, the LM 36 issues a notification of a route of the schema to the utility 30 (printer manager), as shown in step S2404 in FIG. 7 (step S6). The notification is performed via the OS, for example.

In this regard, the route of the schema refers to the information with which the LM 36 can identify data of the schema that the LM 36 stores. For a method of describing the route, the information using a mark "¥" with which a hierarchy is specified can be applied. In addition, an address of the schema data that is stored as the method of describing the route or a pointer may be used.

Referring back to FIG. 5, the utility 30 (printer manager) monitors whether there is a notification. When a notification is issued, the utility 30 determines that there is a notification interruption via the OS (step S7).

Figure 9:
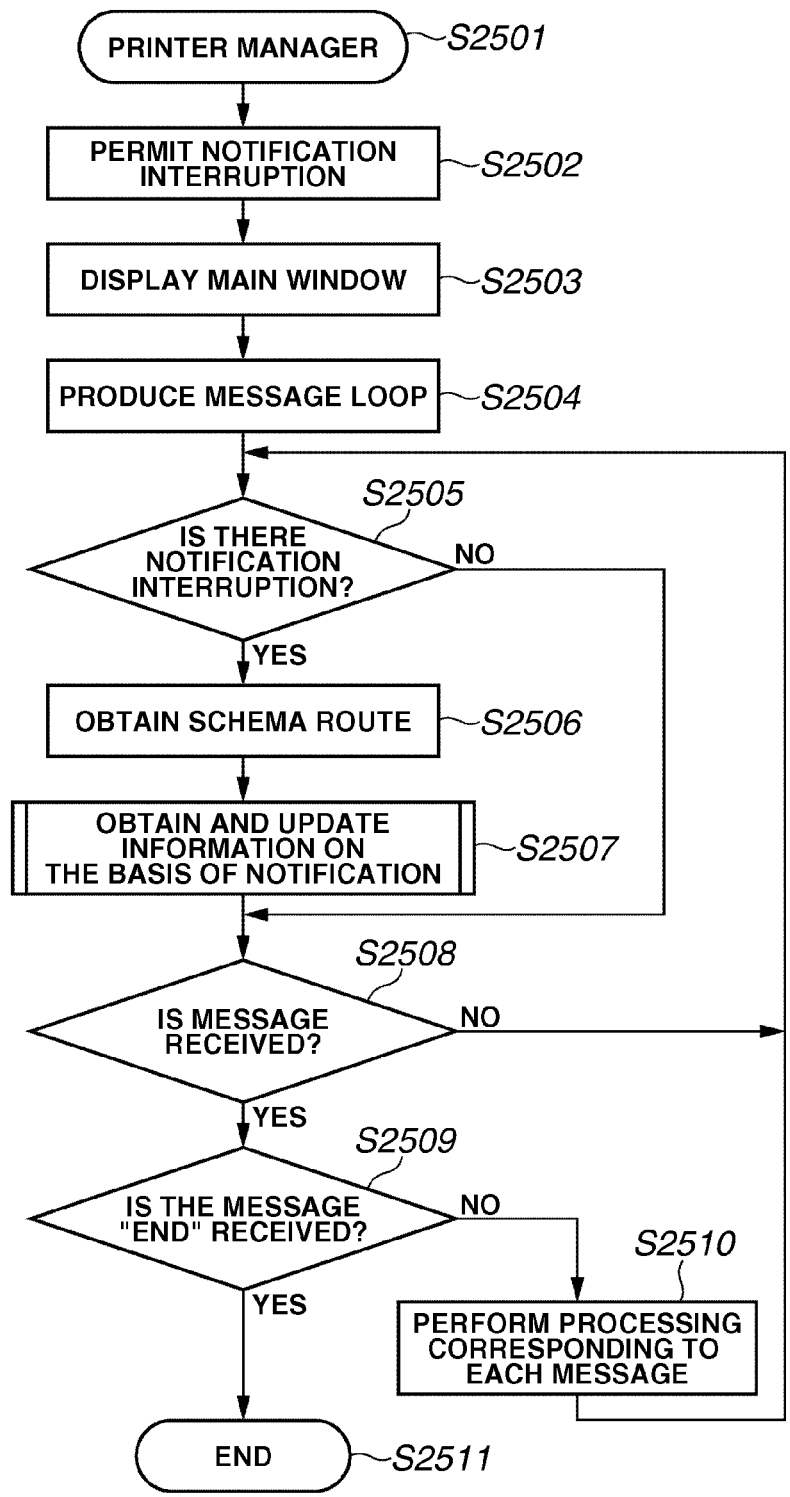
FIG. 9 is a flow chart illustrating a processing for obtaining printer information performed by a utility.

Then, the utility 30 acquires the schema route that is notified, as shown in step S2506 in FIG. 9. Here, the schema route is the information concerning the notification. After that, the schemata are specified as arguments in the call of an application program interface (API) function "IBidiSpl::SendRecv( )" of a COM interface "IBidiSpl".

More specifically, the utility 30 starts a process for enumerating and acquiring information and a state of ink, an operation status, hardware information, paper feed unit information, paper discharge unit information, system information, and unknown information that is to be newly defined in the future. After the processing is started, the utility 30 issues a request for detailed information using the schema to the LM 36 (step S8).

Then, as described in steps S2603 and S2604, within the "SendRecvBidiDataFromPort( )" function of the LM 36, the utility 30 acquires (loads) the schema data that describes the detailed information of the schema specified as the argument in step S2602 from among information stored in the form of the schema definition in step S2403 in FIG. 7 (step S9).

Figure 10:
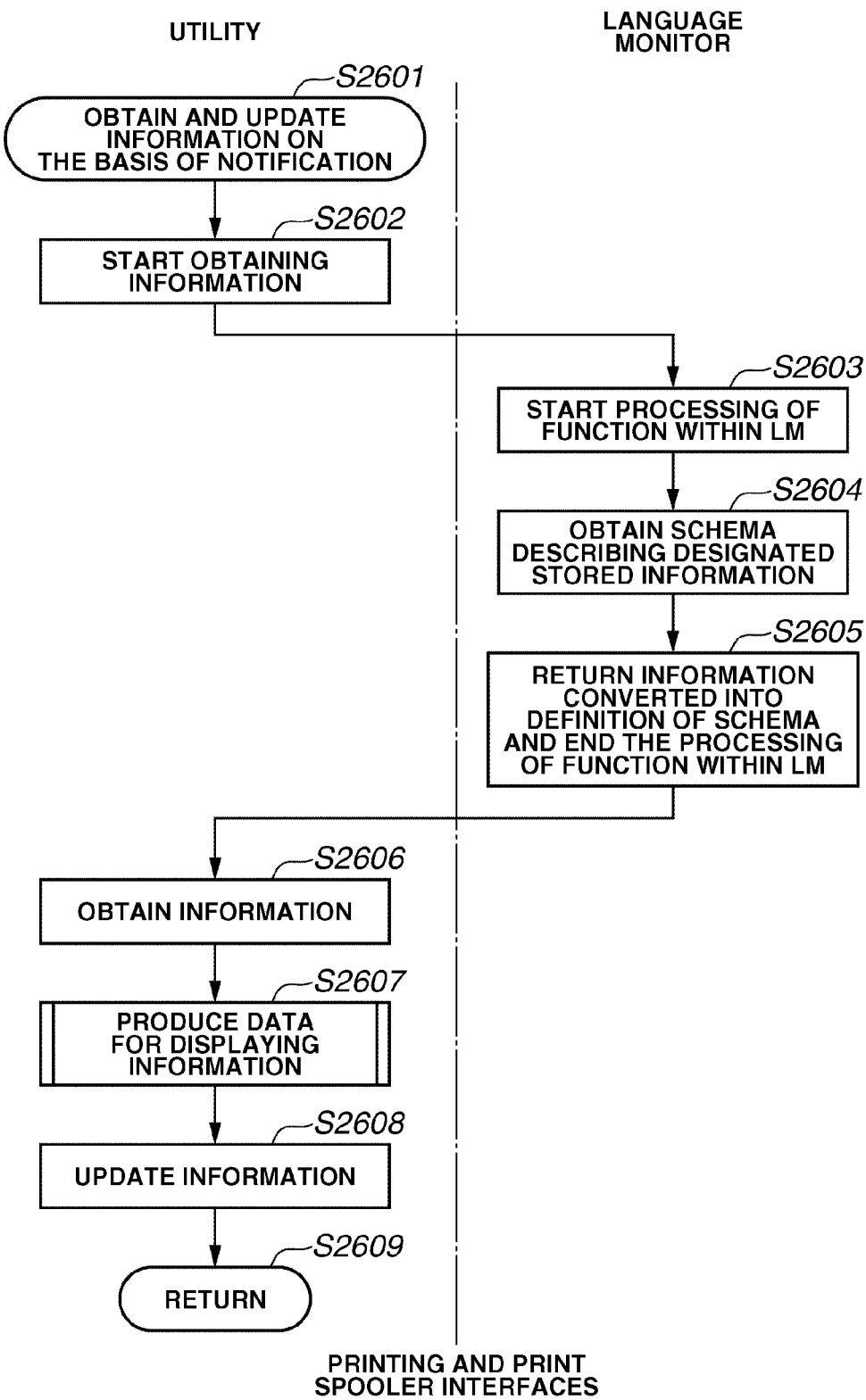
FIG. 10 is a flow chart illustrating a processing for obtaining printer information performed by the utility.

Then, as shown in step S2605 in FIG. 10, the LM 36 returns to the utility 30 (printer manager) the detailed information (schema data) that is acquired in step S9 as the argument of the "SendRecvBidiDataFromPort( )" function of the LM 36 and converted into the schema definition (step S10).

Figure 11:
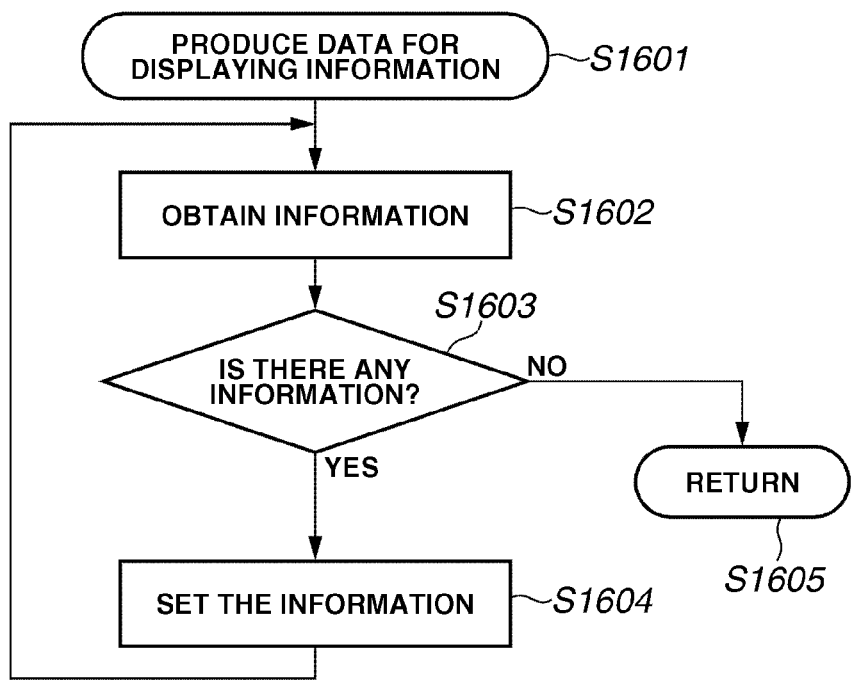
FIG. 11 is a flow chart illustrating the processing for producing data for displaying information.

Then, the utility 30 (printer manager) acquires the detailed information (schema data) that is returned in the form of the schema definition, produces data for displaying information as shown in FIG. 11, and updates a display appearance of the user interface by using the data for displaying information that is thus displayed (step S11).

A process for acquiring information concerning the printing apparatus that is performed in accordance with the system configuration, the hardware configuration, and the software configuration as described above will now be described.

<Description on a Notification Service Processing by a Monitoring Unit (LM 36)>

Figure 6:
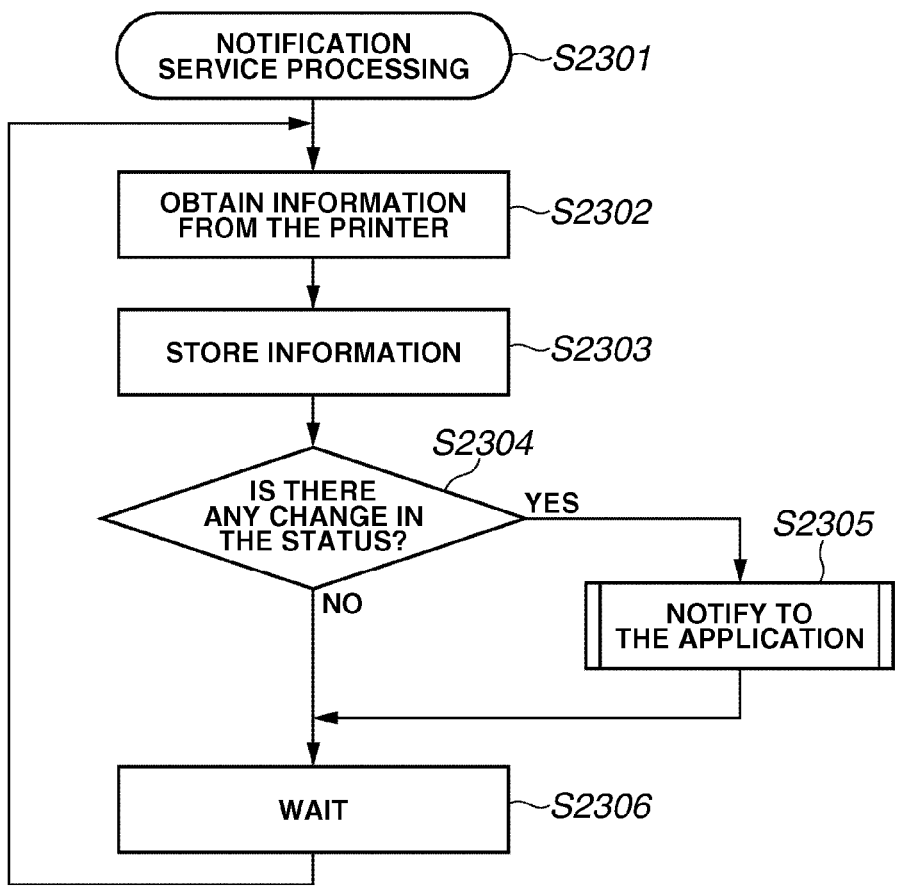
FIG. 6 is a flow chart of a notification service processing performed by a monitoring unit.

FIG. 6 is a flow chart of a notification service process performed by the language monitor (LM 36).

First, while the OS is being activated, the LM 36 is loaded and starts the notification service (step S2301). Then, the LM 36 acquires information returned from the printer 3 in accordance with a request command (information request) or a registration of an event to the printer 3, via a communication channel (USB cable) (step S2302). For the command that the LM 36 issues to the printer 3 at this time, a command that complies with a command specification that is uniquely defined depending on a manufacturer of the OS can be applied, for example. Then, the LM 36 stores the acquired information (step S2303). The LM 36 then determines whether there is a change in the information from the information that is previously stored (step S2304).

If it is determined that there is a change, the LM 36 sends the changed information to the utility 30 as an argument, and then performs the process of notification to the utility 30 (printer manager) (step S2305). The process performed here is equivalent to a process that is performed in relation to the changed information. Then, after that, the process waits for a given period of time (for example, for five seconds) (step S2306), and the process returns to step S2302.

On the other hand, if in step S2304 it is determined that there is no change in the information from the previously-stored information, the process proceeds to step S2306, then waits for the given period of time, and then the process returns to step S2303, as described above.

In this manner, while the OS is being activated, the LM 36 performs a unique notification service of acquiring the information from the printer 3 at a given interval and issuing, if there is a change in the information, a notification to the utility 30 (printer manager), so that the change in the state of the printer 3 can be notified to the utility 30 (printer manager) at an approximately real time.

FIG. 7 is a flow chart illustrating a detailed process of notification of information to the utility performed by the language monitor. With this process, the data of a format that enables a response to the request from the utility for obtaining the schema data by the schema route can be retained.

When the process of notification to the utility 30 (printer manager) is performed in step S2305 in FIG. 6 as explained above, the process as shown in the flow chart of FIG. 7 is called so as to be performed. Then, as shown in FIG. 7, the process of notification to the utility 30 (printer manager) is started (step S2401). Then, the changed information that is sent as the argument in step S2305 in FIG. 6 is subjected to conversion in accordance with the definition of the schema (step S2402). Then, all the data converted in accordance with the schema definition is stored (step S2403).

Next, the route of the converted schema data is notified to the utility 30 (printer manager) (step S2404), and the process returns (step S2405). The schema route is described as, for example, "¥Printer.InkInfo", "¥Printer.StatusInfo", or "¥Printer.HardwareInfo". In addition, the schema route is described as, for example, "¥Printer.InputBinsInfo", "¥Printer.OutputBinsInfo", "¥Printer.SystemInfo", or "¥Printer.StatusInfo".

<Description on a Process of Conversion into the Schema Definition Performed by the Language Monitor (LM 36)>

Figure 8:
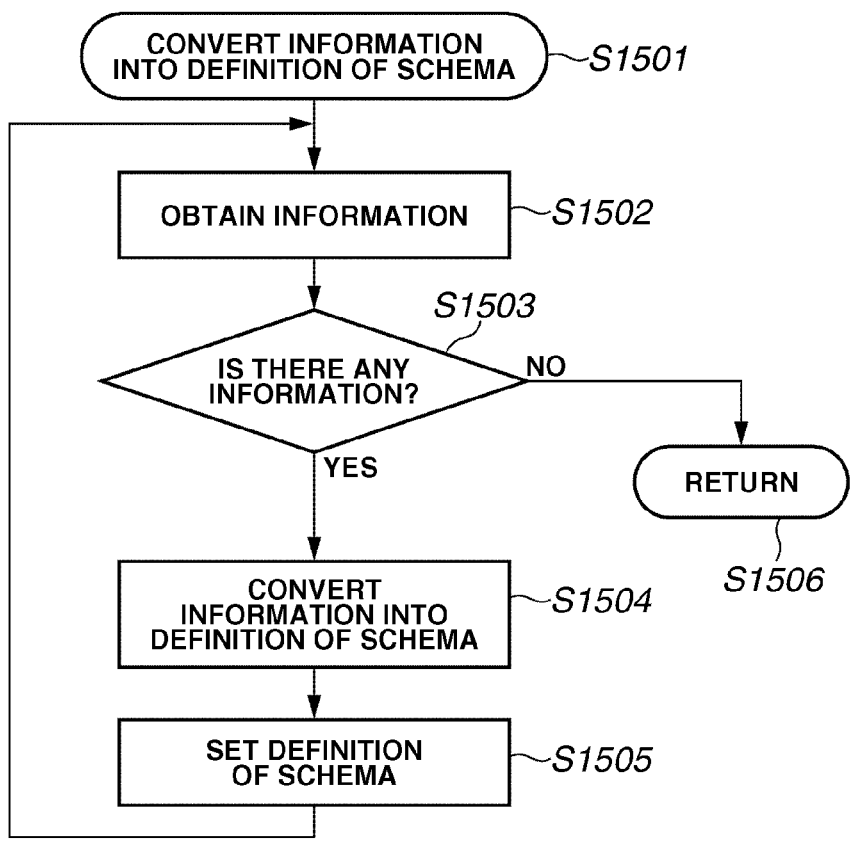
FIG. 8 is a flow chart illustrating a conversion processing according to a schema definition.

FIG. 8 is a flow chart illustrating a process for converting the information performed by the LM 36 in accordance with the schema definition. When the process for converting the information into the schema definition is performed in step S2402 in FIG. 7, step S1501 in FIG. 8 is called.

Then, as shown in FIG. 8, the process for converting the information into the schema definition performed by the LM 36 is started (step S1501). After that, the LM 36 confirms the information and a state of ink, the operation state, the hardware information, the paper feed unit information, and the paper discharge unit information that the printer 3 acquires in step S2303 in FIG. 6 in this order (step S1502).

If it is determined that there is any information that is changed (step S1503), the changed information is converted into the schema definition (step S1504). Then, the schema definition is set as a return value (step S1505), and the process returns to step S1502. When all the information is confirmed and there is no information to perform the conversion processing any more in step S1503, the set return value is returned and the process returns to the flow shown in FIG. 7 (step S1506)

<Description on a Process Performed by the Utility>

FIG. 9 is a flow chart illustrating a process for obtaining the method of acquiring the information of the printer 3 (schema route) performed by the utility 30 (printer manager).

Referring to FIG. 9, when the utility 30 is activated (step S2501), receiving of the notification interruption of the notification service performed by the LM 36 as described with reference to FIG. 6 is permitted (step S2502). Then, a main window is displayed (step S2503). After that, a message loop is produced and the process waits until a message is issued (until the interruption occurs) (step S2504).

If the interruption of the notification that is sent from the LM 36 to the utility 30 (printer manager) in step S2404 in FIG. 7 occurs (step S2505), the utility 30 acquires the notified schema route (step S2506).

Then, the utility 30 performs a process for acquiring and updating the information, based on the schema route that is acquired in step S2506 (step S2507).

In step S2508, it is determined whether the message loop produced in step S2504 receives the message (step S2508). If it is determined that the message is received, whether the received message is a message "End" is determined (step S2509). If it is determined that the received message is the message "End", the processing ends all the processes performed by the utility 30 (printer manager) and terminates the utility 30 (printer manager) (step S2511).

On the other hand, if it is determined that the received message is not the message "End" in step S2509, the process corresponding to each message is performed (the detailed description thereof is omitted here) (step S2510). Then, after step S2510, the process returns to step S2505.

If no message is received in step S2508, the process returns to step S2505. If no notification interruption occurs in step S2505, the process advances to step S2508.

<Acquirement and Updating of the Information in Accordance with the Notification>

FIG. 10 is a flow chart illustrating a process for acquiring and updating the information in accordance with the notification. FIG. 10 shows the details of step S2507 described above.

Referring to FIG. 10, first, the utility 30 (printer manager) starts the process for acquiring and updating the information in accordance with the notification (step S2601)

Then, the process calls the API function "IBidiSpl::SendRecv( )" (the function that the spooler exports) of the COM interface "IBidiSpl" using the route notified from the LM 36 in step S2404 in FIG. 7 as the argument.

More specifically, the information and state of ink, the operation state, the hardware information, the paper feed unit information, the paper discharge unit information, the system information, and the unknown information that is to be newly defined in the future are enumerated.

When the process for acquiring the information is started (step S2602), the "SendRecvBidiDataFromPort( )" function that the LM 36 exports is called from the spooler 40 via the printing and print spooler interfaces so as to start the process using the function (step S2603).

Then, within the "SendRecvBidiDataFromPort( )" function of the LM 36, the schema that describes the detailed information of the schema that is specified as the argument in step S2602 from among the information stored in the form of the schema definition in step S2403 in FIG. 7 is acquired (loaded) (step S2604).

Then, the detailed information that is converted into the schema definition as shown in FIG. 16, FIG. 20, and FIG. 25 that are to be described later below is returned as the argument of the "SendRecvBidiDataFromPort( )" function. Then, the processing of the "SendRecvBidiDataFromPort( )" function of the LM 36 ends (step S2605).

Then, the utility 30 (printer manager), when the API function "IBidiSpl::SendRecv( )" is returned, acquires the detailed information that is returned in the form of the schema definition as shown in FIG. 16, FIG. 20 and FIG. 25 that are to be described later below as the argument (step S2606).

Figure 18:
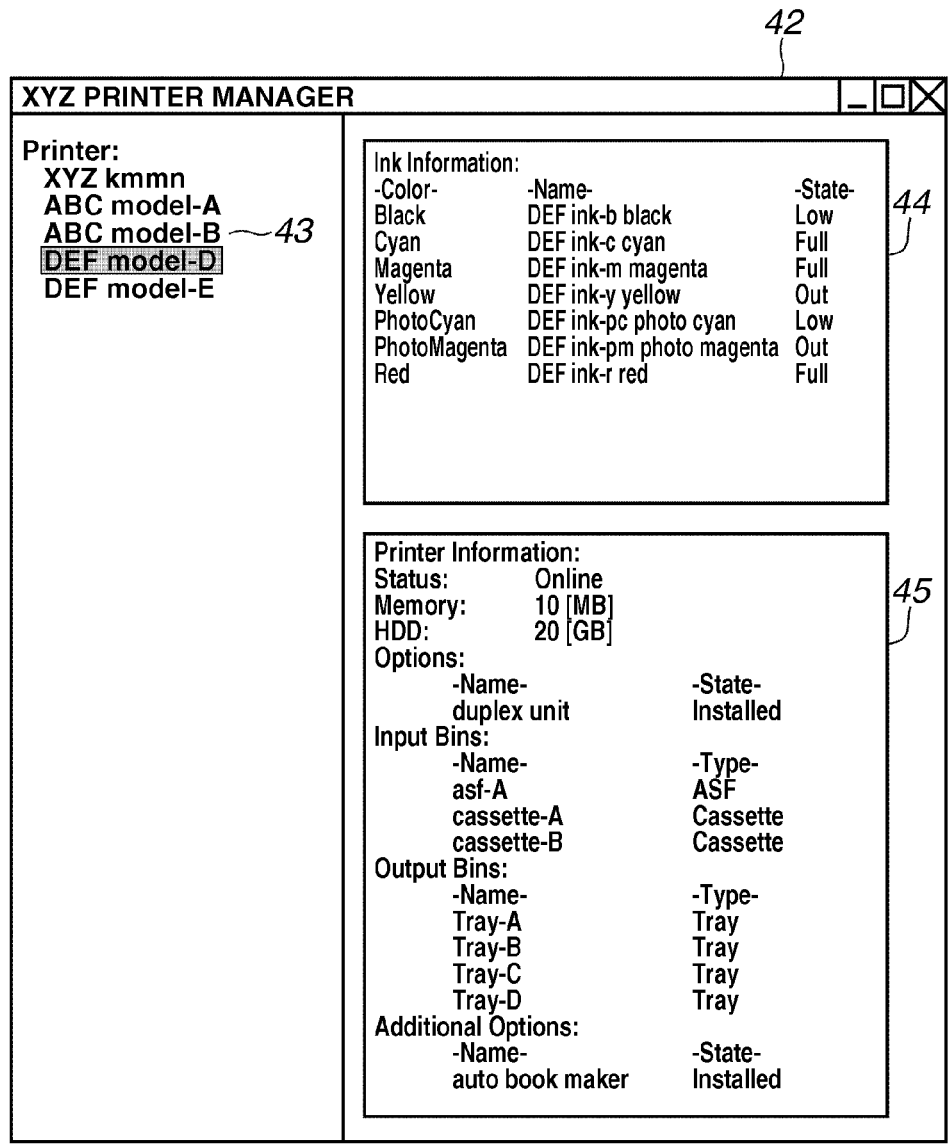
FIG. 18 is a diagram illustrating an appearance of a user interface of the utility.
Figure 22:
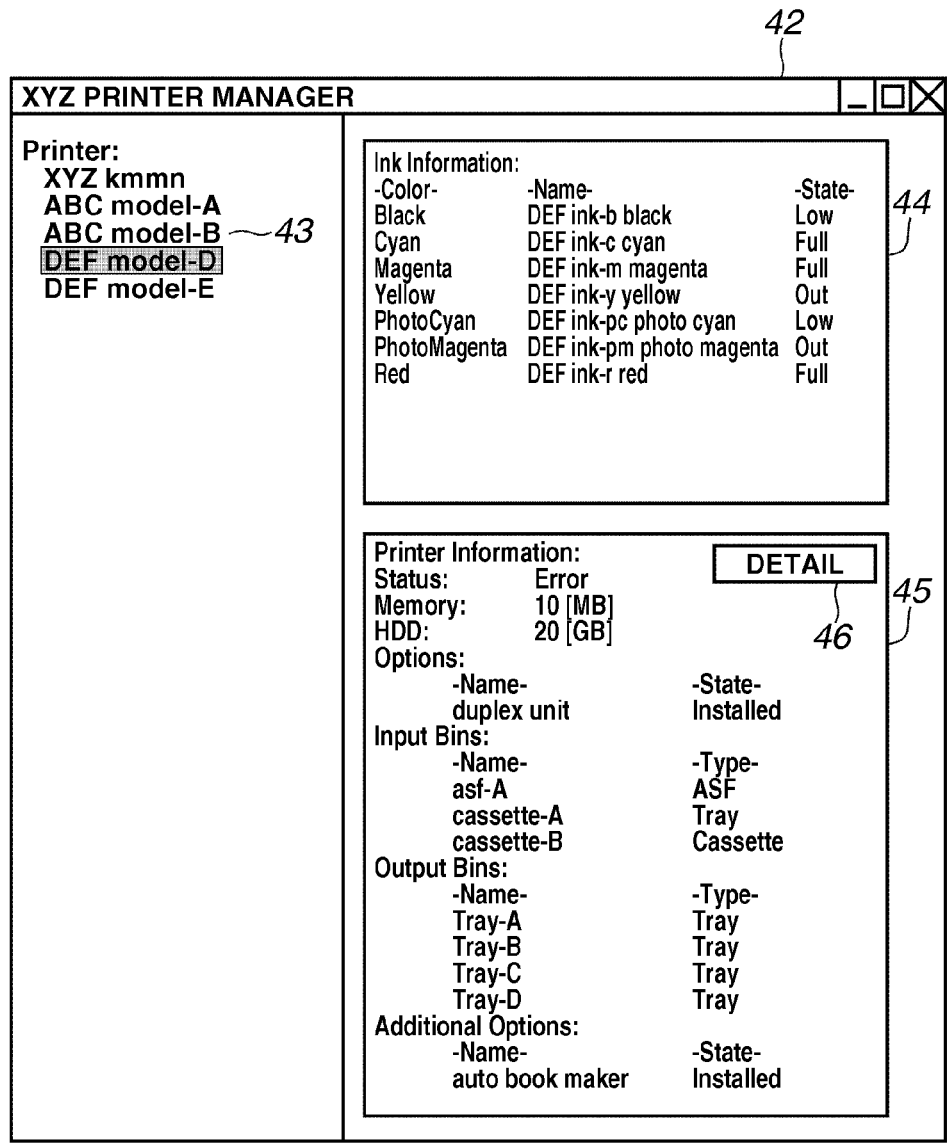
FIG. 22 is a diagram illustrating an appearance of a user interface of the utility.

Then, the utility 30 (printer manager) produces data for displaying the information as shown in FIG. 11 (step S2607). The utility 30 (printer manager) updates the content displayed in an ink information display unit 44 and a printer information display unit 45 as shown in FIG. 12, FIG. 18, and FIG. 22 that are to be described later below by using the produced data for displaying information (step S2608). Then, the processing returns the flow shown in FIG. 9 (step S2609).

In this manner, using the schema route acquired from the LM 36 in step S2506 in FIG. 9 as the argument and making an inquiry to the LM 36 by using the argument as it is, the detailed information specified in the schema route can be acquired. That is, the utility 30 (printer manager) can utilize the schema without noticing the content of the schema that is handled as the argument, even if the schema is an unknown schema whose content is unknown. In addition, using information returned from the LM 36, the utility 30 can appropriately and accurately update the content of the display by the ink information display unit 44 and the printer information display unit 45. Thus, the utility 30 (printer manager) does not need to be redesigned even when a new function is added to the printer 3, and the utility 30 (printer manager) can be continuously used as it is for the future.

<Description on the Processing for Producing the Data for Displaying the Information>

FIG. 11 is a flow chart illustrating the process for producing the data for displaying the information. When the process for producing the data for displaying the information is performed in step S2607 in FIG. 10, step S1601 in FIG. 11 is called.

First, the utility 30 starts the process for producing the data for displaying the information (step S1601). Then, the utility 30 attempts to acquire the information and the state of ink, the operation state, the hardware information, the paper feed unit information, and the paper discharge unit information (step S1602).

Then, when the utility 30 can acquire the information (step S1603), the information is set as the return value (step S1604), and then the process returns to step S1602. If all the information is completely acquired and there is no information to acquire any more in step S1603, the set return value is returned and the process returns to the flow shown in FIG. 10 (step S1605).

<Description of the Appearance of the Display of the User Interface of the Utility>

FIG. 12 illustrates the appearance of the user interface of the utility 30.

A main window 42 includes a printer display unit 43, an ink information display unit 44, and a printer information display unit 45. The printer display unit 43 displays all the printers that support the protocol that the utility 30 can communicate with and that are in a communicable state. The ink information display unit 44 is a portion in which the information concerning various kinds of ink is displayed. The ink information display unit 44 displays the information concerning the ink loaded in the printer that is focused by boxing the printer with a gray box shown in the printer display unit 43.

As shown in FIG. 12, the printer 3 is loaded with seven different colors of ink. Namely, black, cyan, magenta, yellow, photo black, photo cyan, and photo magenta inks are loaded in the printer 3.

FIG. 12 illustrates that the names of color inks are CI-B Black, CI-C Cyan, CI-M Magenta, CI-Y Yellow, CI-PB Photo Black, CI-PC Photo Cyan, and CI-PM Photo Magenta, respectively. In addition, FIG. 12 illustrates that the states of inks are Full (ink remaining amount is full), Low (ink remaining amount is low), Out (no ink remaining), Full (ink remaining amount is full), Low (ink remaining amount is low), Out (no ink remaining), and Low (ink remaining amount is low), respectively.

The printer information display unit 45 is a portion in which the information concerning the printer is displayed. The printer information display unit 45 displays the information concerning the printer that is focused by boxing with the gray box shown in the printer display unit 43.

As shown in FIG. 12, the printer 3 is installed with a 2 MB memory and a 5 GB hard disk drive. In addition, the printer 3 is equipped with a duplex unit named "Auto Duplex Unit" as an option. In addition, the printer 3 is equipped with an auto sheet feeder named "ASF-1" as the paper feed unit, a tray named "Manual Tray", and a cassette named "Cassette-1". In addition, the printer 3 is equipped with the trays named "Tray-1", "Tray-2", and "Tray-3". Here, the printer 3 is in an "Online" state.

In FIG. 12, the information and the state of the printer (the printer 3) with a model name "kmmn" of XYZ Corporation are displayed in the printer information display unit 45. The layout of each of the printer display unit 43, the ink information display unit 44, and the printer information display unit 45 can be controlled to vary in accordance with the content of the display. Thus, all the content can be correctly displayed in different cases without being affected by the current state.

In this regard, a conventional utility can display the printer of XYZ Corporation only. However, as shown in FIG. 12, the utility according to this embodiment can display the printers of other corporations such as ABC Corporation and DEF Corporation in the printer display unit 43. That is, as is described later below, the utility 30 (printer manager) of the present embodiment can also acquire the information of the state of the printer of another corporation whose specification and content of the information are unknown. This is because as long as the printer or the language monitor that controls the printer has a capability to return the information to the utility 30 (printer manager) via a PPSI by utilizing a BCS, the information and the state of the printer can be displayed.

<The Schema Definition Related to the Ink Information>

FIG. 13 is a diagram illustrating the schemata that are used when the utility 30 acquires the information and the state of the ink loaded in the printer. The schemata are specified as the arguments in the call of the API function "IBidiSpl::SendRecv( )" of the COM interface "IBidiSpl" that can be used in the Windows (registered trademark) XP OS when the utility 30 acquires the information and the state of the ink from the printer 3 via the LM 36 through the printing and print spooler interfaces.

FIG. 13 includes the same content as the content that is described with reference to FIG. 32. In FIG. 13, the content that is different from the content as described in FIG. 32 is enclosed with a dotted line box. In FIG. 13, "InkInfo" has a node type "Property" and indicates information concerning ink. The full path to the "InkInfo" in the schema is "¥Printer.InkInfo". "[Color]" has the node type "Property" and indicates information concerning color. The full path to the "[Color]" in the schema is "¥Printer.InkInfo.[Color]". Allowed values are any one of "Black" indicating black, "Cyan" indicating cyan, "Magenta" indicating magenta, "Yellow" indicating yellow, "PhotoBlack" indicating photo black, "PhotoCyan" indicating photo cyan, "PhotoMagenta" indicating photo magenta, "Red" indicating red, "Green" indicating green, and "Blue" indicating blue.

When the information concerning the black ink is to be acquired, "¥Printer.InkInfo.Black" is specified. "Installed" has a node type "Value" and a data type "Boolean", and indicates whether the [Color] ink is loaded. The full path to the "Installed" in the schema is "¥Printer.InkInfo.[Color]: Installed". Allowed values are "True" indicating that the [Color] ink is loaded and "False" indicating that the [Color] ink is not loaded. "State" has the node type "Value" and a data type "String", and indicates the states of the remaining amount of the [Color] ink. The full path to the "State" in the schema is "¥Printer.InkInfo.[Color]:State". Allowed values are "Full" indicating that the [Color] ink is full, "Low" indicating that the remaining amount of the [Color] ink is low, "Out" indicating that the [Color] ink is out, and "Unknown" indicating that the remaining amount of the [Color] ink is unknown. "Name" has the node type "Value" and a data type "String", and indicates the name of the [Color] ink. The full path to the "Name" in the schema is "¥Printer.InkInfo.[Color]:Name". Allowed values are, for example, ASCII character strings shown in "Examples" in FIG. 13. In this manner, the utility 30 can acquire the information and the state of the ink loaded in the printer 3 by using the schema defined in FIG. 13. As is known by comparison to FIG. 32, in FIG. 13, new inks such as photo black, photo cyan, photo magenta, red, green, and blue are added as a new function.

<Description on the Schema Definition Concerning the Hardware Information>

FIG. 14 is a diagram illustrating the schemata that are used when the utility 30 acquires the hardware information of the printer. The schemata are specified as the arguments in the call of the API function "IBidiSpl::SendRecv( )" of the COM interface "IBidiSpl" that can be used in the Windows (registered trademark) XP OS when the utility 30 acquires the hardware information from the printer 3 via the LM 36 through the printing and print spooler interfaces. Here, the information that cannot be displayed by the conventional utility is enclosed with a dotted line box. The portion enclosed with the dotted line box in FIG. 14 indicates that a duplex unit is newly added as an option.

In FIG. 14, "HardwareInfo" has a node type "Property" and indicates the operation state. The full path to the "HardwareInfo" in the schema is "¥Printer.HardwareInfo". When the hardware information is to be acquired, "¥Printer.HardwareInfo" is specified. "Memory" has the node type "Value" and a data type "Integer", and indicates the size of the memory installed to the printer. The full path to the "Memory" in the schema is "¥Printer.HardwareInfo:Memory". Allowed values are integers (unit: MB) that indicate the size of the memory. When the information on the memory size is to be acquired, "¥Printer.HardwareInfo:Memory" is specified. "HDD" has the node type "Value" and a data type "Integer", and indicates the size of the hard disk drive installed to the printer. The full path to the "HDD" in the schema is "¥Printer.HardwareInfo:HDD". Allowed values are integers (unit: GB) that indicate the size of the HDD. When the size of the HDD is to be acquired, "¥Printer.HardwareInfo:HDD" is specified. "Option" has a node type "Property" and indicates the type of the option. The full path to the "Option" in the schema is "¥Printer.HardwareInfo.[Option]". When the information of the duplex unit is to be acquired, "¥Printer.HardwareInfo.DuplexUnit" is specified. "Installed" has the node type "Value" and a data type "Boolean", and indicates whether the [Option] type option is installed. The full path to the "Installed" in the schema is "¥Printer.HardwareInfo.[Option]:Installed". Allowed values are "True" indicating that the [Option] type option is installed and "False" indicating that the [Option] type option is not installed. "Name" has the node type "Value" and a data type "String", and indicates the name of the [Option] type option. The full path to the "Name" in the schema is "¥Printer.InkInfo.[Option]:Name". Allowed values are, for example, ASCII character strings shown in "Examples" in FIG. 14. Here, the values "Memory", "HDD", "Installed", and "Name" are the values that are returned to the utility 30 from the LM 36 or the printer 3. In this manner, the utility 30 can acquire the hardware information of the printer 3 by using the schema defined in FIG. 14.

<Description of the Schema Definition Concerning the Paper Feed Unit of the Printer>

FIG. 15 is a diagram illustrating the schemata that are used when the utility 30 acquires the information concerning the paper feed unit of the printer. The schemata are specified as the arguments in the call of the API function "IBidiSpl::SendRecv( )" of the COM interface "IBidiSpl" that can be used in the Windows (registered trademark) XP OS when the utility 30 acquires the information concerning the paper feed unit from the printer 3 via the LM 36 through the printing and print spooler interfaces. Here, the information that cannot be displayed by the conventional utility is enclosed with a dotted line box. The portion enclosed with the dotted line box in FIG. 15 indicates that a paper feed unit such as a tray and a cassette is newly added as a new function.

In FIG. 15, "InputBinsInfo" has a node type "Property" and indicates the information concerning the paper feed unit. The full path to the "InputBinsInfo" in the schema is "¥Printer.InputBinsInfo". "[Type]" has the node type "Property" and indicates the type of the paper feed unit. The full path to the "[Type]" in the schema is "¥Printer.InputBinsInfo.[Type]". Allowed values are "ASF" indicating an auto sheet feeder, "Tray" indicating a tray, and "Cassette" indicating a cassette. When the information concerning the paper feed unit of the auto sheet feeder is to be acquired, "¥Printer.InputBinsInfo.ASF" is specified. "Installed" has the node type "Value" and a data type "Boolean", and indicates whether the [Type] type paper feed unit is installed. The full path to the "Installed" in the schema is "¥Printer.InputBinsInfo.[Type]:Installed". Allowed values are "True" indicating that the [Type] type paper feed unit is installed and "False" indicating that the [Type] type paper feed unit is not installed. "Name" has the node type "Value" and a data type "String", and indicates the name of the [Type] type paper feed unit. The full path to the "Name" in the schema is "¥Printer.InputBinsInfo.[Type]:Name". Allowed values are, for example, ASCII character strings shown in "Examples" in FIG. 15. Here, the values "Installed" and "Name" are the values that are returned to the utility 30 from the LM 36 or the printer 3. In this manner, the utility 30 can acquire the information of the paper feed unit installed to the printer 3 by using the schema defined in FIG. 15.

<Description of a Relationship between the Request by the Utility and the Schema Route that is Obtained>

FIG. 16 is a diagram illustrating the schema and the value when the information and the state of ink, the operation state, the hardware information, the paper feed unit information, and the paper discharge unit information are enumerated by the schema definition described above. FIG. 16 includes the same content as the content that is described with reference to FIG. 31. In FIG. 16, the content that is different from the content as described in FIG. 31 is enclosed with a dotted line box.

Referring to FIG. 16, when each schema route is specified by using the utility 30 and the "IBidiSpl::SendRecv( )" function is called (the "Query" (Schema) column), the schema (Retrieve (Schema)) that describes the information and the state of the printer 3 and the value (Retrieve (Value)) are returned in a set.

The schema route that is specified by the utility 30 is described as, for example, "¥Printer.InkInfo", "¥Printer.StatusInfo", "¥Printer.HardwareInfo", "¥Printer.InputBinsInfo", and "¥Printer.OutputBinsInfo".

In the example as shown in FIG. 16, the black, cyan, yellow, photo black, photo cyan, and photo magenta inks are loaded in the printer 3. In addition, and the states of inks are "Ink remaining amount full (Full)", "Ink remaining amount low (Low)", "No Ink remaining (Out)", "Ink remaining amount full (Full)", "Ink remaining amount low (Low)", "No Ink remaining (Out)", and "Ink remaining amount low (Low)".

In addition, FIG. 16 indicates that the names inks are "CI-B Black", "CI-C Cyan", "CI-M Magenta", "CI-Y Yellow", "CI-PB Photo Black", "CI-PC Photo Cyan", and "CI-PM Photo Magenta".

In addition, FIG. 16 indicates that the operation state is "Online" and in a "Standby" mode. The size of the installed memory is 2 MB and the size of the installed hard disk drive is 5 GB. In addition, the option of the duplex unit named "Auto Duplex Unit" is installed.

In addition, FIG. 16 indicates that the auto sheet feeder named "ASF-1" is installed to the printer as the paper feed unit, and that the tray named "Manual Tray" and the cassette named "Cassette-1" are also installed. In addition, the trays named "Tray-1", "Tray-2", and "Tray-3" are installed to the printer. The utility 30 enumerates the information by using the schema in this manner, and the utility 30 can acquire all the detailed information of the printer that is described by the schema. As is known by comparison to FIG. 11, the photo black, photo cyan, and photo magenta inks, the duplex unit option, and the paper feed unit such as the "Manual Tray" tray and the "Cassette-1" cassette are added as a new function.

<Description of a Specific Example of the Information Acquired from the Printer>

Figure 17:
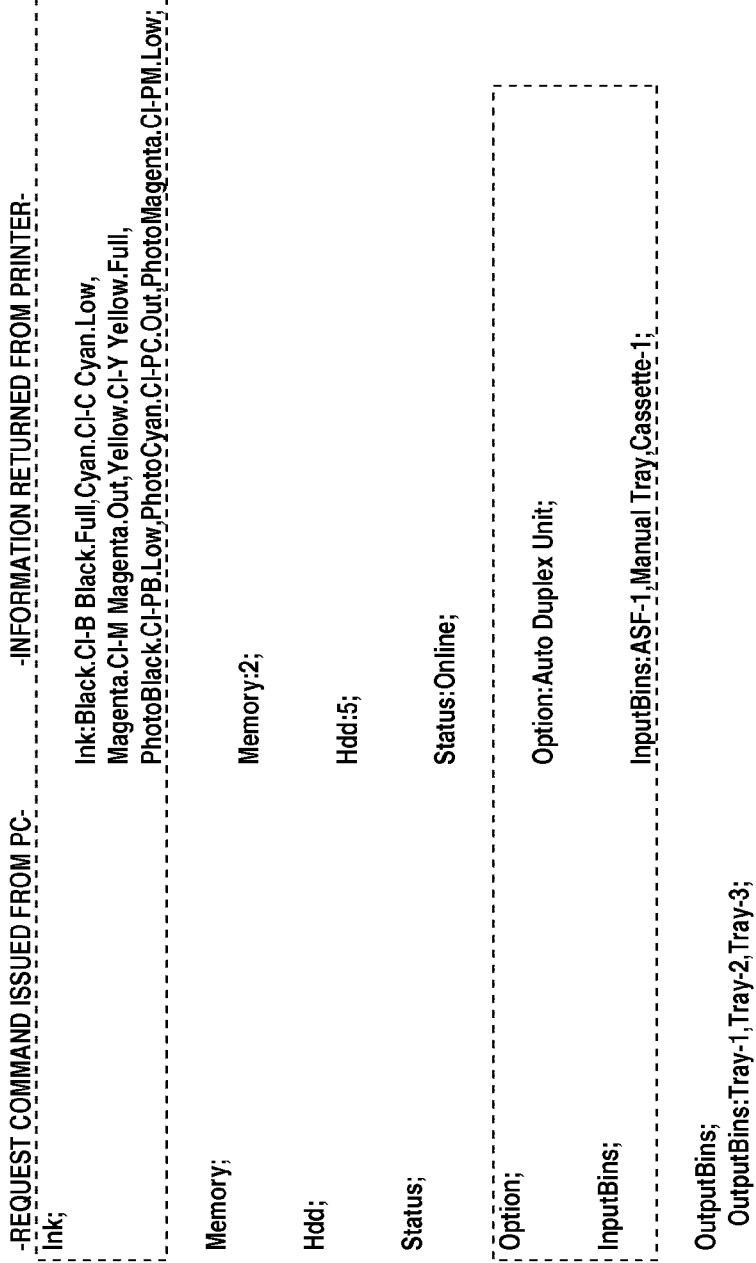
FIG. 17 is a diagram illustrating data sent and received between a PC and the printer.

FIG. 17 is a diagram illustrating data sent and received between the PC 1 and the printer 3. The data that is sent and received between the PC 1 and the printer 3 is binary data. However, for easier understanding, in FIG. 17, the data is described as text data after being subjected to encoding with the ASCII character code.

Referring to FIG. 17, when the PC 1 issues the command in a "Request Command Issued from PC" column to the printer 3 via the USB interface 9, the information in the "Information Returned from Printer" column is returned to the PC 1 from the printer 3 via the USB interface 9. In FIG. 17, "Ink;" indicates a command for requesting the information and the state of the ink. Here, the response returned from the printer 3 is described as, in the order of "Color", "Model Name", and "State", "Black", "CI-B", "Full"; "Cyan", "CI-C", "Low"; "Magenta", "CI-M", "Out"; "Yellow", "CI-Y", "Full"; "PhotoBlack", "CI-PB", "Low"; "PhotoCyan", "CI-PC", "Out"; and "PhotoMagenta", "CI-PM", "Low", respectively.

In addition, "Memory;" indicates a command for requesting the size of the memory. The response returned from the printer 3 reads "<size 2" (unit: MB).

In addition, "HDD;" indicates a command for requesting the size of the hard disk drive. The response returned from the printer 3 reads "5" (unit: GB). In addition, "Status;" indicates a command for requesting the operation state. The response returned from the printer 3 indicates "Online" as the operation state. "Option;" indicates a command for requesting the option. The response returned from the printer 3 indicates that the installed option is "Auto Duplex Unit". In addition, "InputBins;" indicates a command for requesting the paper feed unit. The response returned from the printer 3 indicates that the paper feed unit information includes "ASF-1", "Manual Tray", and "Cassette-1".

In addition, "OutputBins;" indicates a command for requesting the paper discharge unit. The response returned from the printer 3 indicates that the paper discharge unit includes "Tray-1", "Tray-2", and "Tray-3".

FIG. 17 indicates that the photo black, photo cyan, and photo magenta inks, the duplex unit option, and the paper feed unit such as the "Manual Tray" tray and the "Cassette-1" cassette are provided.

Second Embodiment

<Display Appearance of the User Interface of the Utility 30>

FIG. 18 is a diagram illustrating the utility 30 according to a second embodiment. In FIG. 18, the main window 42, the printer display unit 43, the ink information display unit 44, and the printer information display unit 45 are the same as those in FIG. 12.

Note that in FIG. 18, the printer display unit 43 displays a printer that is not shown in FIG. 12. In addition, in FIG. 18, the ink information display unit 44 and the printer information display unit 45 display the information and the state of the printer with a model name "model-D" of DEF Corporation.

As is known from the content displayed in the ink information display unit 44, "model-D" of DEF Corporation is loaded with seven colors of inks, namely, Black, Cyan, Magenta, Yellow, PhotoCyan, PhotoMagenta, and Red inks.

In addition, FIG. 18 indicates that the names of inks are "DEF ink-b black", "DEF ink-c cyan", "DEF ink-m magenta", "DEF ink-y yellow", "DEF ink-pc photo cyan", "DEF ink-pm photo magenta", and "DEF ink-r red", respectively.

In addition, FIG. 18 indicates that the states of color inks are "Low (Ink remaining amount low)", "Full (Ink remaining amount full)", "Full (Ink remaining amount full)", "Out (No Ink remaining)", "Low (Ink remaining amount low)", "Out (No Ink remaining)", and "Full (Ink remaining amount full)", respectively.

As is known from the content that is displayed in the printer information display unit 45, "model-D" of DEF Corporation is installed with a 10-MB memory, a 20-GB hard disk drive, and a duplex unit named "duplex unit". In addition, "model-D" is installed with the auto sheet feeder named "asf-A" as the paper feed unit and the cassettes named "cassette-A" and "cassette-B". In addition, "model-D" is installed with the trays named "tray-A", "tray-B", "tray-C", and "tray-D". Here, "model-D" is in the "Online" state. As is known by comparison to FIG. 12, "model-D" of DEF Corporation is newly equipped with a bookmaking component named "auto book maker" as a function that is not equipped to "kmmn" (the printer 3) of XYZ Corporation. Thus, according to the present embodiment, even if the printer is equipped with a new function, the utility 30 (printer manager) does not need to be redesigned in accordance with the new function.

FIG. 19 shows schemata that are used when the utility 30 acquires the system information of the printer. The schemata are used when the utility 30 acquires the system information from the printer 3 via the LM 36 through the printing and print spooler interfaces. More specifically, the schemata are specified as the arguments in the call of the API function "IBidiSpl::SendRecv( )" of the COM interface "IBidiSpl" that can be used in the Windows (registered trademark) XP OS.

In FIG. 19, "SystemInfo" has a node type "Property" and indicates the system information. The full path to the "SystemInfo" in the schema is "¥Printer.SystemInfo". When the system information is to be acquired, "¥Printer.SystemInfo" is specified.

"Component" has a node type "Property" and indicates the type of the component that constitutes the system. The full path to the "Component" in the schema is "¥Printer.System-Info.[Component]". An allowed value is "BookMaker" that indicates the bookmaking component. When the information concerning the bookmaking component is to be acquired, "¥Printer.SystemInfo.BookMaker" is specified. "Installed" has the node type "Value" and a data type "Boolean", and indicates whether the [Component] type component is installed. The full path to the "Installed" in the schema is "¥Printer.SystemInfo.[Component]:Installed". Allowed values are "True" indicating that the [Component] type component is installed and "False" indicating that the [Component] type component is not installed.

"Name" has the node type "Value" and a data type "String", and indicates the name of the [Component] type component. The full path to the "Name" in the schema is "¥Printer.SystemInfo.[Component]:Name". Allowed values are, for example, ASCII character strings shown in "Examples" in FIG. 19.

Here, the values "Installed" and "Name" are the values that are returned to the utility 30 from the LM 36 or the printer 3. In this manner, the utility 30 can acquire the system information of the printer 3 by using the schema defined in FIG. 19.

FIG. 20 is a diagram illustrating the schema and the value when the information and the state of ink, the operation state, the hardware information, the paper feed unit information, the paper discharge unit information, and the system information are enumerated by using the schemata defined in FIGS. 13 through 15 and FIG. 19. FIG. 20 includes the same content as the content that is described with reference to FIG. 31 and FIG. 16. In FIG. 20, the schema definition that is different from the schema definition as described in FIG. 31 and FIG. 16 is enclosed with a dotted line box.

Referring to FIG. 20, each schema route from the utility 30 is specified and the "IBidiSpl::SendRecv( )" function is called. The schema route is described as, for example, "¥Printer.InkInfo", "¥Printer.StatusInfo", "¥Printer.HardwareInfo", "¥Printer.InputBinsInfo", "¥Printer.OutputBinsInfo", and "¥Printer.SystemInfo".

Then, in the "Query" (Schema) column, the schema ("Retrieve" (Schema)) that describes the information and the state of "model-D" of DEF Corporation and the value ("Retrieve" (Value)) are returned in a set. The example shown in FIG. 20 describes that "model-D" of DEF Corporation is loaded with Black, Cyan, Magenta, Yellow, PhotoCyan, PhotoMagenta, and Red inks. In addition, FIG. 20 indicates that the state of remaining amount of each color ink is "Low (Ink remaining amount low)", "Full (Ink remaining amount full)", "Full (Ink remaining amount full)", "Out (Ink not remaining)", "Low (Ink remaining amount low)", "Out (Ink not remaining)", and "Full (Ink remaining amount full)", respectively. In addition, FIG. 20 indicates that the name of each ink is "DEF ink-b black", "DEF ink-c cyan", "DEF ink-m magenta", "DEF ink-y yellow", "DEF ink-pc photo cyan", "DEF ink-pm photo magenta", and "DEF ink-r red", respectively.

In addition, FIG. 20 indicates that the operation state is "Online" and in a "Standby" mode. The size of the installed memory is 10 MB and the size of the installed hard disk drive is 20 GB. In addition, the option of the duplex unit named "duplex unit" is installed. In addition, FIG. 20 indicates that the auto sheet feeder named "asf-A" is installed as the paper feed unit, and that the cassettes named "cassette-A" and "cassette-B" are also installed. In addition, the trays named "Tray-A", "Tray-B", "Tray-C", and "Tray-D" are installed. In addition, FIG. 20 indicates that the bookmaking component named "auto book maker" is installed.

The utility 30 enumerates the information by using the schema in this manner, and the utility 30 can acquire all the detailed information of the printer that is described by the schema. As is known by comparison to FIG. 31 and FIG. 16, the red ink and the bookmaking component are added as a new function.

FIG. 21 is a diagram illustrating data sent and received between the PC 1 and the printer 3. The data that is sent and received between the PC 1 and the printer 3 is binary data. However, for easier understanding, in FIG. 21, the data is described as text data after being subjected to encoding with the ASCII character code. Referring to FIG. 21, when the PC 1 issues the command in a "Request Command Issued from PC" column to "model-D" of DEF Corporation via the USB interface, the information in the "Information Returned from Printer" column is returned to the PC from "model-D" via the USB interface.

In FIG. 21, "ReqInk;" indicates a command for requesting the information and the state of the ink. Here, the response returned from the printer 3 is described as, in the order of "Color", "Model Name", and "State", "Black", "ink-b", "Low"; "Cyan", "ink-c", "Full"; "Magenta", "ink-m", "Full"; "Yellow", "ink-y", "Out"; "PhotoCyan", "ink-pc", "Low"; "PhotoMagenta", "ink-pm", "Out"; and "Red", "ink-r", "Full", respectively.

In addition, "ReqMemory;" indicates a command for requesting the size of the memory. The response returned from the printer 3 reads "10" (unit: MB). In addition, "ReqHDD;" indicates a command for requesting the size of the hard disk drive. The response returned from the printer 3 reads "20" (unit: GB).

In addition, "ReqStatus;" indicates a command for requesting the operation state. The response returned from the printer 3 indicates "Online" as the operation state. "ReqOption;" indicates a command for requesting the option. The response returned from the printer 3 indicates that the installed option is "duplex unit". In addition, "ReqInputBins;" indicates a command for requesting the paper feed unit. The response returned from the printer 3 indicates that the paper feed unit information includes "asf-A", "cassette-A", and "cassette-B".

In addition, "ReqOutputBins;" indicates a command for requesting the paper discharge unit. The response returned from the printer 3 indicates that the paper discharge unit includes "tray-A", "tray-B", "tray-C", and "tray-D". In addition, "ReqSystem;" indicates a command for requesting the system. The response returned from the printer 3 indicates that the system (component) is "auto book maker".

In FIG. 20, the name of the ink is returned by the description such that "Retrieve (Schema)" is "¥Printer.InkInfo.Black:Name" and "Retrieve (Value)" is "DEF ink-b black", for example.

This is described in accordance with the processing by the language monitor of DEF Corporation based on the information that the "Request Command Issued from PC" is "ReqInk;" and the "Information Returned from Printer" is "AnsInk:black.ink-••-ink-r.Full;". Here, the language monitor of DEF Corporation produces the name of the ink on the basis of the "Information Returned from Printer" and returns the produced name of the ink to the utility 30.

Thus, the language monitor (the LM 36) can perform the processing such that the information acquired from the printer (the printer 3) is returned to the printer manager (the utility 30) by converting the acquired information into the appropriate information, without returning the acquired information to the utility 30 as it is.

Third Embodiment

FIG. 22 is a diagram illustrating the appearance of the display of the user interface of the utility 30 according to a third embodiment. In the third embodiment, a part of the specification of the printer information display unit 45 of the utility 30 shown in FIG. 22 and FIG. 18 is changed. In FIG. 22, the main window 42, the printer display unit 43, and the ink information display unit 44 are the same as those shown in FIG. 12 and FIG. 18. Note that in FIG. 22, the printer display unit 43 displays a printer that is not shown in FIG. 12. In addition, in FIG. 22, the ink information display unit 44 and the printer information display unit 45 display the information and the state of the printer with a model name "model-D" of DEF Corporation.

In a state (Status:) display unit within the printer information display unit 45, a message "Error" is displayed. This is displayed because the information indicating an error is notified from the printer. For example, the utility 30 in FIG. 18, when the information indicating an error is notified, causes the state (Status:) display unit shown in FIG. 18 to display the message "Error" that is the same as shown in FIG. 22.

In FIG. 22, a detailed information display button (Detail) 46 is a portion characteristic to the third embodiment. In this regard, there is a case where when a new schema is defined that describes a warning or an error enclosed with a dotted line box as shown in FIG. 24, there is information that cannot be fully displayed in the state display unit. The detailed information display button 46 becomes effective and highlighted when there is information that cannot be fully displayed or when the detailed information is desired to be displayed. The detailed information display button 46 becomes inoperable in other occasions and is turned to be grayed out in such other occasions. In addition, when the information indicating a warning or error is notified, the detailed information display button 46 may be lit or may blink in yellow or red. When the detailed information display button 46 is effective and is pressed, a detailed information dialog box as shown in FIG. 23 is displayed.

Figure 23:
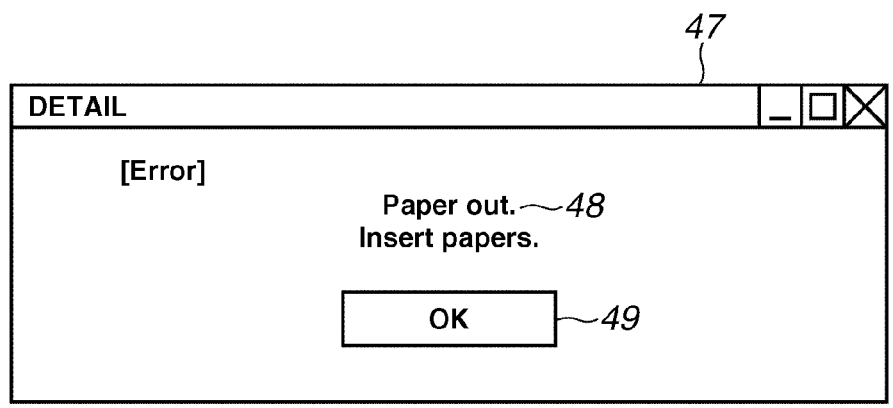
FIG. 23 is a diagram illustrating an example of a detailed information dialog box.

FIG. 23 is a diagram illustrating an example of the detailed information dialog box. Referring to FIG. 23, a detailed information dialog box 47 is displayed when the detailed information display button 46 as shown in FIG. 22 is pressed. In a detailed information display unit 48, the detailed information on the operation state of the printer is displayed. In the detailed information display unit 48, the information as described in "Examples:" of the definition of "Detail" in FIG. 24 is displayed. When an OK button 49 is pressed, the detailed information dialog box is closed and the display returns to the main window 42 shown in FIG. 22.

FIG. 24 is a diagram illustrating the schemata that are used when the utility 30 acquires the operation state of the printer. The schemata are specified as the arguments in the call of the API function "IBidiSpl::SendRecv( )" of the COM interface "IBidiSpl" that can be used in the Windows (registered trademark) XP OS when the utility 30 acquires the operation state from the printer 3 (printer) via the LM 36 (language monitor) through the printing and print spooler interfaces. Here, the information that cannot be displayed by the conventional utility is enclosed with a dotted line box. FIG. 24 includes the same content as the content that is described with reference to FIG. 7, and the content different from that shown in FIG. 32 is enclosed with a dotted line box.

In FIG. 24, "StatusInfo" has a node type "Property" and indicates the operation state. The full path to the "StatusInfo" in the schema is "¥Printer.StatusInfo". "[Type]" has the node type "Property" and indicates the type of the operation state. The full path to the "[Type]" in the schema is "¥Printer.StatusInfo.[Type]". Allowed values are "Online" indicating the online state, "Offline" indicating the offline state, "Printing" indicating the printing state, "Warning" indicating the warning, and "Error" indicating the error. When the information concerning the operation state of the printer in the online state is to be acquired, "¥Printer.StatusInfo.Online" is specified.

"Detail" has the node type "Value" and a data type "String", and indicates the detailed information of the [Type] type operation state. The full path to the "Detail" in the schema is "¥Printer.StatusInfo.[Type]:Detail". Allowed values are, for example, ASCII character strings shown in "Examples" in FIG. 24. The value of "Detail" is the value that is returned from the printer 3 (printer) or the LM 36 (language monitor) to the utility 30. In this manner, the utility 30 can acquire the operation state of the printer 3 (printer) by using the schema defined in FIG. 24.

FIG. 25 is a diagram illustrating the schema and the value when the information and the state of ink, the operation state, the hardware information, the paper feed unit information, the paper discharge unit information, and the system information are enumerated by using the schemata defined in FIGS. 13 through 15, FIG. 19, and FIG. 24. FIG. 25 includes the same content as the content described with reference to FIG. 31, FIG. 16, and FIG. 20. In FIG. 25, the content different from that shown in FIG. 20 is enclosed with a dotted line box. With reference to FIG. 25, the content different from FIG. 20 is described.

Referring to FIG. 25, when the schema route of "¥Printer.StatusInfo" is specified by using the utility 30 and the "IBidiSpl::SendRecv( )" function is called (in the "Query" (Schema) column), the schema (Retrieve (Schema)) that describes the information and the state of "model-D" of DEF Corporation and the value (Retrieve (Value)) are returned in a set. FIG. 25 shows an example of a case where "model-D" that is in the online state and in a standby mode as shown in FIG. 20 changes into an out-of-paper error state.

FIG. 26 is a diagram illustrating data sent and received between the PC and the printer 3. The data that is sent and received between the PC and the printer 3 is binary data. However, for easier understanding, in FIG. 26, the data is described as text data after being subjected to encoding with the ASCII character code. FIG. 26 includes the same content as the content described with reference to FIG. 21. In FIG. 26, the content different from that shown in FIG. 21 is enclosed with a dotted line box. With reference to FIG. 26, the content different from FIG. 21 is described.

Referring to FIG. 26, when the PC issues the command in a "Request Command Issued from PC" column to "model-D" of DEF Corporation via the USB interface, the information in the "Information Returned from Printer" column is returned to the PC from "model-D" via the USB interface. With respect to the information, "ReqStatus;" indicates the operation state request command, and the response to the command indicates the out-of-paper error indicating that there is no paper loaded.

Figure 27:
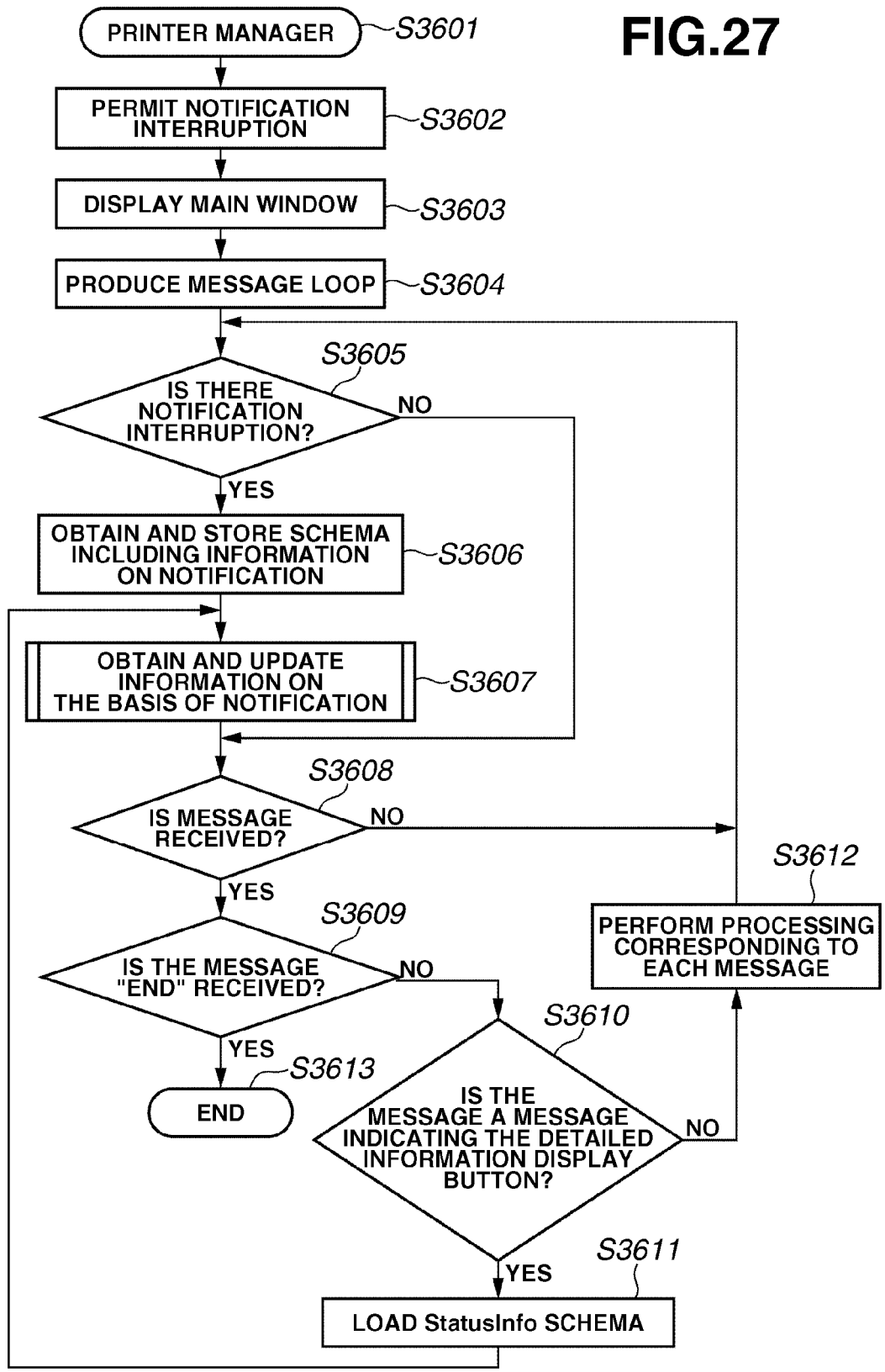
FIG. 27 is a flow chart of a processing for obtaining printer information performed by the utility.

FIG. 27 is a flow chart of the processing by the utility 30 (printer manager) according to the third embodiment.

Referring to FIG. 27, when the utility 30 is activated (step S3601), interruption of the notification service performed by the LM 36 (language monitor) as shown in FIG. 6 is permitted (step S3602). Then, the utility 30 displays the main window as shown in FIG. 22 (step S3603), and then produces a message loop (step S3604). In step S3605, the utility 30 determines whether interruption by the notification sent from the LM 36 (language monitor) to the utility 30 (printer manager) in step S2404 in FIG. 7 occurs. If it is determined that the notification interruption occurs in step S3605, the utility 30 acquires and stores the route of the schema that is notified, namely, the information concerning the notification (step S3606). Then, the utility 30 performs the processing for acquiring and updating the information in accordance with the notification, just as described with reference to FIG. 10 (step S3607).

The utility 30 (printer manager) determines whether the message loop produced in step S3604 receives the message (step S3608). If it is determined that the received message is the message "End" (step S3609), all the processing by the utility 30 (printer manager) ends, and the process terminates the utility 30 (step S3613).

If in step S3609 it is determined that the received message is not the message "End", the utility 30 determines whether the detailed information display button 46 is pressed in step S3610. This determination step enables the determination as to whether the utility 30 acquires the information that the LM 36 retains by using the schema route (method of acquiring) to be acquired from the LM 36. Then, if it is determined that the detailed information display button 46 is pressed (step S3610), the "StatusInfo" schema "¥Printer.StatusInfo" that is stored in step S3606 is loaded (step S3611), and then the processing advances to step S3607.

If in step S3610 it is determined that the received message is the message other then the message that indicates that the detailed information display button 46 is pressed, the processing corresponding to each message is performed (a detailed description of the processing is omitted here) (step S3612), and the processing returns to step S3605.

If it is determined in step S3608 that there is no message received, the processing returns to step S3605. If in step S3605 it is determined that no notification interruption occurs, the processing advances to step S3608.

Thus, when the message indicating that the detailed information display button 46 is pressed, that is, when the detailed information display button 46 is pressed, the utility 30 (printer manager) acquires the operation state of the printer 3 (printer) from the LM 36 (language monitor). Thus, the printer manager (the utility 30) does not attempt to acquire unnecessary information from the LM 36 (language monitor). That is, the utility 30 can properly acquire necessary information only on a "need to know" basis so as to improve the processing efficiency and improve the quality of a print product.

Figure 28:
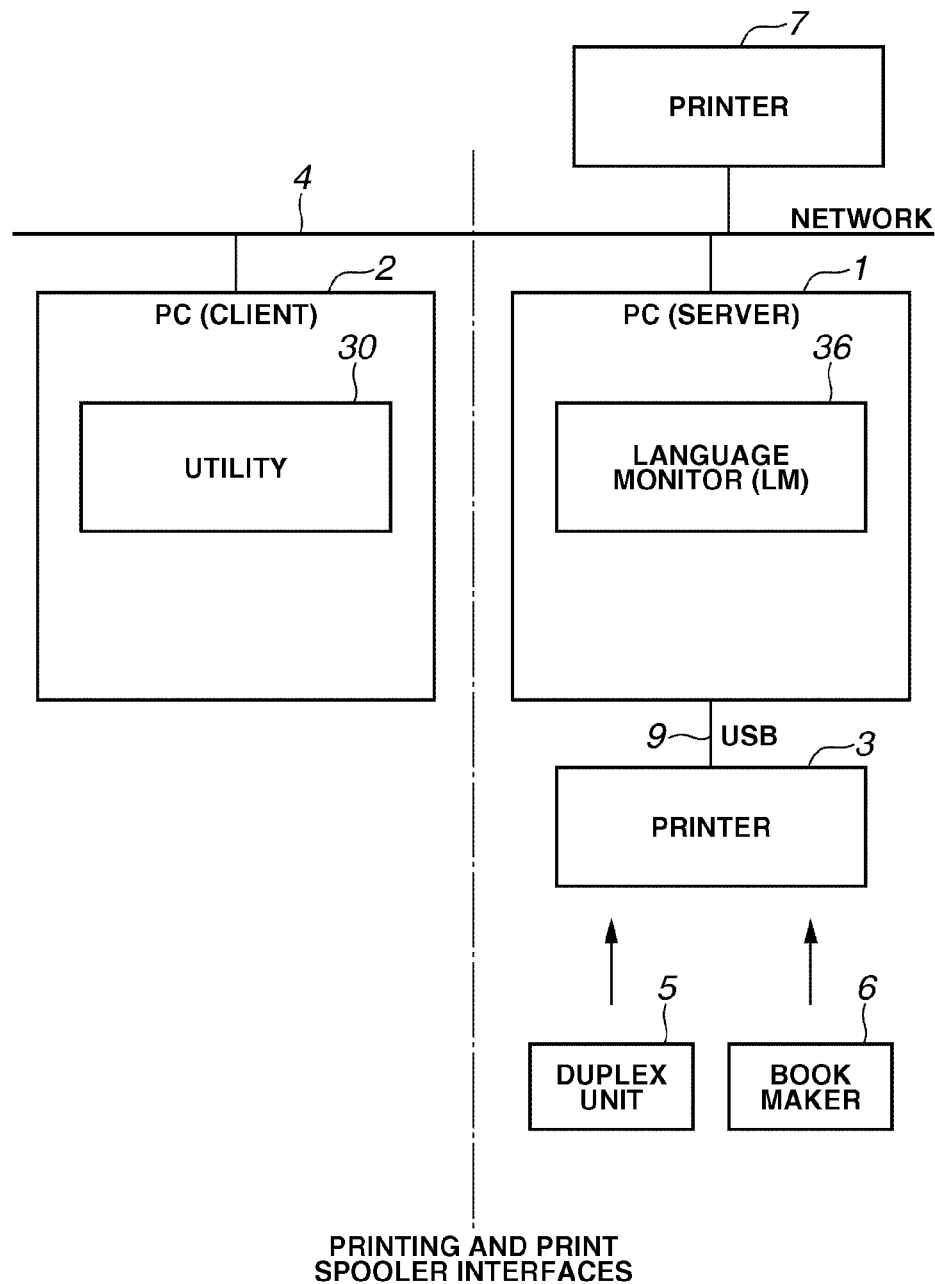
FIG. 28 is a diagram illustrating an outline of another printing system.

FIG. 28 illustrates an outline of another printing system. FIG. 28 shows a case where a network-ready printer 7 is connected to the network 4 of a peripheral device control system as shown in FIG. 1. In FIG. 28, the utility 30 (printer manager) used in the PC 2 can display the information and the state of the network-ready printer 7. A part of the processing related to the present embodiment, which can be performed by the LM 36 in the PC 1, is performed by the network-ready printer 7 in substitution thereto. Here, such a part of the processing is packaged in firmware of the printer 7 so as to perform the processing. In addition, the language monitor in the PC 2 that controls the network-ready printer 7 performs the notification service processing as shown in FIG. 6 so as to perform this part of the processing. Thus, a part of the processing related to the present embodiment is packaged in the firmware of the printer, not in the LM 36, and thus the printer can perform this part of the processing without using the LM 36 so as to achieve the same effect.

Figure 29:
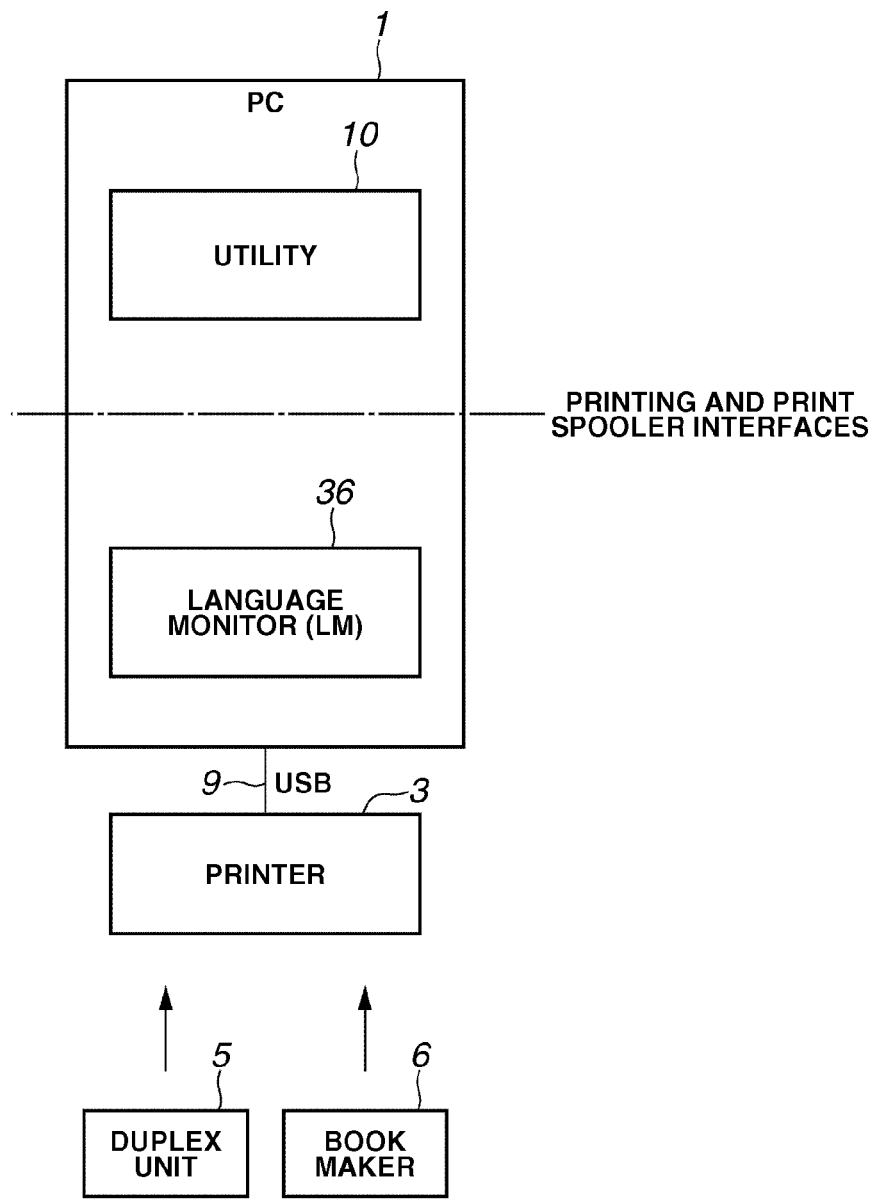
FIG. 29 is a diagram illustrating an outline of another printing system.

FIG. 29 is a block diagram illustrating a portion of a peripheral device control system configured by an information processing apparatus and a peripheral device. FIG. 29 shows a case where the peripheral device control system as shown in FIG. 1 is not implemented on the network 4 but in a local port connection environment configured by a PC and a printer only.

In FIG. 29, a utility 10 is installed in the PC 1. The utility 10 is the same as the utility 30 installed in the PC 2. Thus, the printing and print spooler interfaces are configured between the utility 10 and the LM 36. The data communication as described in each of the above embodiments can be performed between the utility 10 (printer manager) and the LM 36 via the printing and print spooler interfaces.

In the above description, the example in which the utility 30 monitors the information and the state of ink loaded in the printer 3, the operation state of the peripheral device, the warning, the state of errors, and the state of installment of the option is explained. However, the present invention is not limited to this. The present invention can be effectively utilized in acquiring arbitrary information concerning the printer.

In addition, in the above description, the present invention is implemented by utilizing the Bidi communications schema via the printing and print spooler interfaces. However, the present invention is not limited to this. For example, the present invention can be implemented by utilizing a protocol having the same function as the above such as MIB and Universal Plug and Play (UPnP). In addition, in implementing the present invention, a more universal system can be readily achieved by utilizing a standard specification. In addition, in the above embodiments, a color ink jet printer is used as an example of a printer. However, the present invention is not limited to this. For example, an arbitrary printer such as a monochromatic LBP can be used. In addition, a personal computer is referred to as a client computer and a server computer. However, the present invention is not limited to this. For example, the present invention can be effectively implemented by using an arbitrary terminal that can be used in the same usage as described above such as a DVD video player, a game machine, a set top box, and an Internet-ready home appliance.

In addition, in the above embodiments, a printer is referred to as an example of a peripheral device. However, the present invention is not limited to this. That is, another peripheral device such as a copying machine, a facsimile, a scanner, a digital camera, and a device equipped with combined functions thereof can be applied to the present invention. In addition, in the above embodiments, Windows (registered trademark) XP is referred to as an OS. However, the present invention is not limited to this. That is, an arbitrary OS can be applied to the present invention. In addition, Ethernet (registered trademark) is used as an example of the configuration of the network 4. However, the network may have another arbitrary configuration. In addition, the USB interface is used as an interface between the PC 1 and the printer 3. However, the present invention is not limited to this. That is, an arbitrary interface such as Ethernet (registered trademark), wireless LAN, IEEE 1394 bus, Bluetooth, IrDA, parallel, and serial may be used.

Fourth Embodiment

In each of the above embodiments, the timing at which the utility 30 (printer manager) acquires the schema route is based on the notification from a lower side (the LM 36 and the printer 3), as shown in step S2505 in FIG. 9 and step S3605 in FIG. 27. In this regard, however, the timing at which the utility 30 obtains the schema route (method of acquiring) may be at a more applied timing.

For example, the timing may be taken in such a manner that an interruption of event is allowed to occur in the utility 30 and the utility 30 periodically issues an inquiry to the LM 36 or the printer 3 as to whether the acquiring route is present. In addition, the timing may be taken in such a manner that a button for acquiring the route is provided to the UI of the utility 30, and when there is a message indicating that the button is pressed, the presence of the route (method of acquiring) to be newly acquired is acquired from the utility 30 to the LM 36 or the printer 3.

Figure 30:
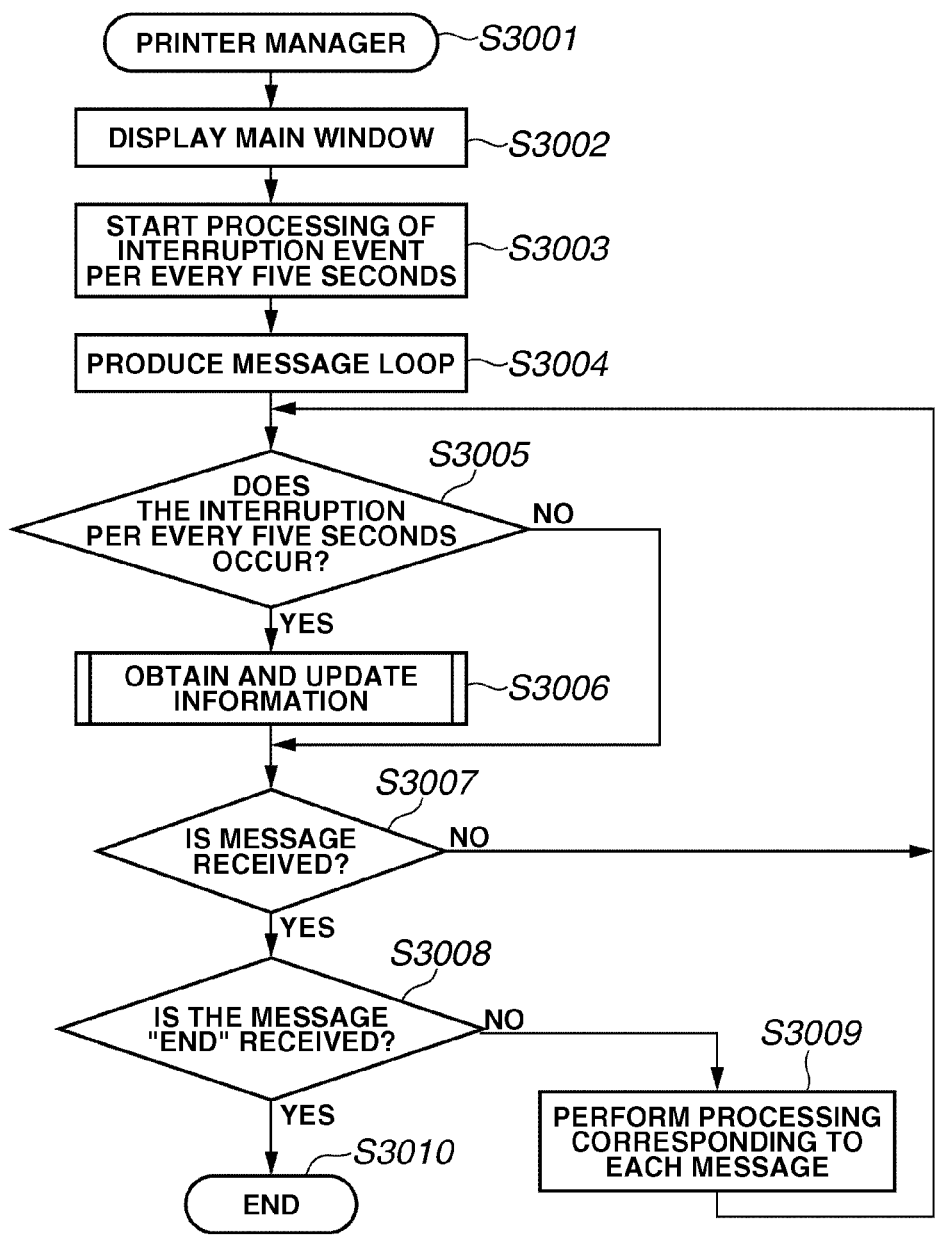
FIG. 30 is a flow chart of a processing for obtaining printer information performed by the utility.

FIG. 30 is a flow chart of the processing performed by the utility 30 according to a fourth embodiment.

Note that for the processing in step S3006, a detailed description is omitted because the same processing as steps shown in the flow chart of FIG. 10 described in the above embodiment is performed. The flow chart of FIG. 30 will now be described in detail.

Referring to FIG. 30, when the printer manager is activated in step S3001, the main window as shown in FIG. 5 is displayed in step S3002. Then, the processing of interruption events every 5 seconds is started, and then a message loop is produced in step S3004.

Next, in step S3005, it is determined whether an interruption event has occurred. If it is determined that the interruption event has occurred, the information shown in FIG. 14 is acquired and updated in step S3006. In step S3007, it is determined whether the message loop produced in step S3004 receives a message. Then, in step S3008, it is determined whether the received message is the message "End". If it is determined that the received message is the message "End" in step S3008, then, in step S3010, all the processing by the printer manager is terminated. On the other hand, if it is determined in step S3008 that the received message is a message other than the message "End", the processing corresponding to each message is performed (step S3009), and then the processing returns to step S3005. If the message is not received in step S3007, the processing returns to step S3005. If the interruption does not occur in step S3005, the processing advances to step S3007.

Fifth Embodiment

In addition, when the route that is the method of acquiring the schema is acquired, the route is written to a file and stored in a form in which the route can be reused when the PC is rebooted, and the printer manager uses the route thereafter. Thus, the convenience of the utility 30 can further be improved.

Other Embodiments

The present invention can also be achieved by providing a system or a device with a storage medium which records program code of software implementing the functions of the embodiments and by reading and executing the program code stored in the storage medium with a computer of the system or the device (the CPU or the MPU). Here, the program code of software that implements each function as shown in each flow chart of the embodiments is recorded on the storage medium.

In this case, the program code itself, which is read from the storage medium, implements the functions of the embodiments mentioned above, and accordingly, the program code and/or the storage medium storing said code constitutes the present invention.

As the storage medium for supplying such program code, a flexible disk, a hard disk, an optical disk, a magneto-optical disk, a CD-ROM, a CD-R, a magnetic tape, a nonvolatile memory card, and a ROM can be used.

In addition, the functions according to the embodiments described above can be implemented not only by executing the program code read by the computer, but also by processing in which an OS (operating system) or the like carries out a part of or the whole of the actual processing on the basis of the instruction given by the program code.

Further, in another aspect of the present invention, if the program code read from the storage medium is written in a memory provided in a function expansion board inserted in the computer or a function expansion unit connected to the computer, a CPU and the like provided in the function expansion board or the function expansion unit can carry out a part of or the whole of the processing to implement the functions of the embodiments as described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2005-234620 filed Aug. 12, 2005 and No. 2006-194350 filed Jul. 14, 2006, which are hereby incorporated by reference herein in their entirety.

What is claimed is:

1. An information processing method performed by an information processing apparatus that is equipped with a monitoring unit that acquires and retains information from a printing apparatus via a communication channel using an information request or an event registration, the information processing method comprising:
   an obtaining step of obtaining from the monitoring unit a route of schema as an acquiring method for acquiring retained information, wherein the acquiring method is positively notified by the monitoring unit and obtained in the obtaining step if there is a change in the information acquired from the printing apparatus by the monitoring unit, the changed information is converted into a schema definition by the monitoring unit, and the route of schema is established based on the schema definition by the monitoring unit;
   an acquiring step of making an inquiry to the monitoring unit by calling a predetermined function with the obtained route of schema as an argument as it is, and of acquiring the retained information; and
   a display controlling step of allowing a display unit to perform a display based on the information acquired in the acquiring step, the display including at least an ink information display unit and a printer information display unit,
   wherein, in a case where configuration information of the printing apparatus is not comprehended by the acquiring step, conversion and establishment of information is performed at the monitoring unit.

2. The information processing method according to claim 1, wherein the monitoring unit converts the retained information acquired from the printing apparatus into a form for responding to an obtaining request based on the acquiring method, and retains the converted information.

3. The information processing method according to claim 2, wherein the acquiring method is a route of the converted and retained information.

4. The information processing method according to claim 1, further comprising a determination step of determining whether to acquire the retained information in accordance with the acquiring method obtained in the obtaining step,
   wherein the acquiring step includes a step of acquiring the retained information based on a determination made in the determination step.

5. A non-transitory computer-readable storage medium having stored thereon a program including computer-executable instructions for performing an information processing method according to claim 1.

6. An information processing apparatus that is equipped with a monitoring unit that acquires and retains information from a printing apparatus via a communication channel using an information request or an event registration, the information processing apparatus comprising:

an obtaining unit adapted to obtain from the monitoring unit a route of schema as an acquiring method for acquiring retained information, wherein the acquiring method is positively notified by the monitoring unit and obtained by the obtaining unit if there is a change in the information acquired from the printing apparatus by the monitoring unit, the changed information is converted into a schema definition, and the route of schema is established based on the schema definition by the monitoring unit;

an acquiring unit adapted to make an inquiry to the monitoring unit by calling a predetermined function with the obtained route of schema as an argument as it is, and of acquiring the retained information; and a display control unit adapted to allow a display unit to perform a display based on the retained information acquired by the acquiring unit, the display including at least an ink information display unit and a printer information display unit, wherein, in a case where configuration information of the printing apparatus is not comprehended by the acquiring unit, conversion and establishment of information is performed at the monitoring unit.

7. The information processing apparatus according to claim 6, wherein the monitoring unit converts the information acquired from the printing apparatus into a form for responding to an obtaining request based on the acquiring method and retains the converted information.

8. The information processing apparatus according to claim 7, wherein the acquiring method is a route of the converted and retained information.

9. The information processing apparatus according to claim 6, further comprising a determination unit adapted to determine whether to acquire the retained information in accordance with the acquiring method obtained by the obtaining unit, wherein the acquiring unit acquires the retained information based on a determination made by the determination unit.

\* \* \* \* \*